US012134695B2

(12) United States Patent
Paulus

(10) Patent No.: US 12,134,695 B2
(45) Date of Patent: Nov. 5, 2024

(54) AQUEOUS BINDER FORMULATION BASED ON FUNCTIONALIZED POLYURETHANES

(71) Applicant: BASF SE, Ludwigshafen am Rhein (DE)

(72) Inventor: Wolfgang Paulus, Ludwigshafen (DE)

(73) Assignee: BASF SE, Ludwigshafen Am Rhein (DE)

(*) Notice: Subject to any disclaimer, the term of this patent is extended or adjusted under 35 U.S.C. 154(b) by 779 days.

(21) Appl. No.: 17/287,295

(22) PCT Filed: Oct. 18, 2019

(86) PCT No.: PCT/EP2019/078307
§ 371 (c)(1),
(2) Date: Apr. 21, 2021

(87) PCT Pub. No.: WO2020/083754
PCT Pub. Date: Apr. 30, 2020

(65) Prior Publication Data
US 2022/0112371 A1 Apr. 14, 2022

(30) Foreign Application Priority Data
Oct. 26, 2018 (EP) .................................. 18202800

(51) Int. Cl.
C08G 18/12 (2006.01)
C08G 18/22 (2006.01)
C08G 18/28 (2006.01)
C08G 18/42 (2006.01)
C08G 18/48 (2006.01)
C08G 18/67 (2006.01)
C08G 18/73 (2006.01)
C08G 18/75 (2006.01)
C08G 18/79 (2006.01)
C08K 5/25 (2006.01)
C08L 75/06 (2006.01)
C08L 75/08 (2006.01)
C09D 175/04 (2006.01)

(52) U.S. Cl.
CPC ............. C08L 75/06 (2013.01); C08G 18/12 (2013.01); C08G 18/227 (2013.01); C08G 18/282 (2013.01); C08G 18/4216 (2013.01); C08G 18/4825 (2013.01); C08G 18/673 (2013.01); C08G 18/73 (2013.01); C08G 18/755 (2013.01); C08G 18/792 (2013.01); C08K 5/25 (2013.01); C08L 75/08 (2013.01); C09D 175/04 (2013.01)

(58) Field of Classification Search
CPC .. C09D 175/04; C08G 18/755; C08G 18/792; C08G 18/4216; C08G 18/4825; C08G 18/282; C08K 5/25
See application file for complete search history.

(56) References Cited

U.S. PATENT DOCUMENTS

| 4,339,566 | A | 7/1982 | Rosenkranz et al. |
| 5,596,065 | A | 1/1997 | Gerlitz et al. |
| 5,684,081 | A | 11/1997 | Dannhorn et al. |
| 6,207,744 | B1 | 3/2001 | Paulus et al. |
| 6,521,702 | B1 | 2/2003 | Weikard et al. |
| 6,538,046 | B1 | 3/2003 | Paulus et al. |
| 2010/0075115 | A1 | 3/2010 | Tuerk et al. |
| 2011/0143055 | A1 | 6/2011 | Tuerk et al. |
| 2015/0005444 | A1* | 1/2015 | Grablowitz .......... C09D 175/12 |
| 2015/0225606 | A1 | 8/2015 | Berger et al. |

FOREIGN PATENT DOCUMENTS

| CN | 101544738 A | 9/2009 |
| CN | 106188563 A | 12/2016 |
| DE | 2936039 A1 | 4/1981 |
| DE | 19525489 A1 | 1/1997 |
| DE | 19810793 A1 | 9/1999 |
| DE | 19933012 A1 | 1/2001 |
| DE | 19957604 A1 | 5/2001 |
| DE | 102010003308 A1 | 1/2011 |
| EP | 0098752 A2 | 1/1984 |
| EP | 0332326 A2 | 9/1989 |
| EP | 0694531 A2 | 1/1996 |
| EP | 1591502 A1 | 11/2005 |
| WO | 2008098972 A1 | 8/2008 |
| WO | 2010018074 A1 | 2/2010 |
| WO | 2014063920 A1 | 5/2014 |
| WO | 2016000989 A1 | 1/2016 |

OTHER PUBLICATIONS

CN106188563 English translation (Year: 2016).*
International Search Report for corresponding PCT/EP2019/078307 mailed Jan. 31, 2021, 2 Pages.
Database WPI, Week 200974, Thomson Scientific, retrieved from STN Database accession No. 2009-P78312, XP002796125, 2017, 2 pages.
Database WPI, Week 201720, Thomson Scientific, retrieved from STN Database accession No. 2016-78938E, XP002796124, 2017, 3 pages.

* cited by examiner

Primary Examiner — Catherine S Branch
Assistant Examiner — Huihong Qiao
(74) Attorney, Agent, or Firm — Armstrong Teasdale LLP

(57) ABSTRACT

Described herein are binder formulations based on acryloyloxy-functionalized polyurethanes.

16 Claims, No Drawings

AQUEOUS BINDER FORMULATION BASED ON FUNCTIONALIZED POLYURETHANES

CROSS-REFERENCE TO RELATED APPLICATIONS

This application is a U.S. National Phase Application of International Patent Application No. PCT/EP2019/078307, filed Oct. 18, 2019, which claims the benefit of priority to European Patent application Ser. No. 18/202,800.1, filed Oct. 26, 2018, the entire contents of which are hereby incorporated by reference herein.

The present invention relates to an aqueous binder formulation comprising
- a) a polyurethane A, and
- b) a carboxylic acid hydrazide B, wherein the polyurethane A can be obtained by reacting
- a1) at least one diisocyanate and/or polyisocyanate (component A1) with
- a2) at least one organic compound having at least two hydroxyl groups, which differs from components A3, A4 and A6 (component A2),
- a3) at least one organic compound having at least one group reactive to an isocyanate group and at least one dispersing group
  or at least one functional group which can be converted to a dispersing group and which differs from components A2, A4 and A6 (component A3),
- a4) at least one organic compound having at least one group reactive to an isocyanate group and at least one optionally substituted acryloyloxy group, which differs from components A2, A3 and A6 (component A4),
- a5) optionally at least one organic compound having only one group reactive to an isocya-nate group, which differs from components A3 and A4 (component A5), and
- a6) optionally at least one organic compound having at least two groups reactive to an isocyanate group, which differs from components A2 to A4 (component A6), wherein none of the components A1 to A6 comprises one or more aldehydic and/or ketonic carbonyl groups.

The present invention also relates to the use of the aqueous binder formulation in various applications, a process for coating substrates with the aqueous binder formulation and the substrates obtainable by the coating process.

Radiation-curable water-emulsifiable polyurethane (meth)acrylates and coating formulations comprising these have been described many times before and are therefore known to those skilled in the art.

For instance, water-dispersible urethane acrylates are already known, for example, from EP-A 98752 or DE-OS 2936039. The hydrophilicity of these known systems is based on the presence of ionic sites, especially of carboxylate or sulfonate groups, which have alkali metal cations or ammonium ions as counterions. The amines which are often present (for neutralization or to increase the molar mass) can cause yellowing of the coating compositions. However, the target molar mass is required to lower the tackiness of the films.

Further radiation-curable water-emulsifiable polyurethane (meth)acrylates are known, for example, from EP-A 694531, DE-A 19525489, DE-A 19810793, DE-A 19933012, DE-A 19957604 or EP-A 1591502.

A common factor for all the products obtainable from the documents cited is that the preparation of the polyurethane (meth)acrylates described therein involves reaction with at least one di- or polyamine.

Furthermore, DE 10 2010 003308 discloses water-emulsifiable urethane (meth)acrylates in which the addition of amines for chain extension is dispensed with in order to reduce yellowing.

WO 2014/63920 also discloses radiation-curable, water-soluble or water-dispersible urethane (meth)acrylates in which the stoppers used in urethane formation are amines substituted by one or two hydrocarbon radicals in which amines the hydrocarbon radicals together have at least 12 carbon atoms.

International applications WO 2008/098972 and WO 2010/018074 also disclose aqueous dispersions of urethane (meth)acrylates and the use thereof for inkjet and printing applications.

A characteristic of the aforementioned radiation-curable, water-emulsifiable polyurethane (meth)acrylates and coating formulations comprising these, however, is that after application to a substrate they cure exclusively by exposure to high-energy radiation, for example UV radiation or electron beams. However, the problem with curing on substrates of the aforementioned radiation-curable, water-emulsifiable polyurethane (meth)acrylates and coating formulations comprising these, is that it does not take place, or only inadequately, in shaded areas, i.e. in areas in which the high-energy radiation does not reach due to a given complex substrate shape deviating from a flat surface, in the case of attachments or structures, interstices, side surfaces and/or undersides of flat, planar substrates or as a result of the radiation-opaque solid particles present in a coating formulation, such as in particular pigments and/or fillers. The same also applies in the case when the corresponding radiation-curable, water-emulsifiable polyurethane (meth)acrylates and coating formulations conmprising these are applied to a substrate in the form of thick layers which the high-energy radiation is unable to penetrate deeply or only insufficiently.

When using hydrazides in binder formulations, the following prior art can be assumed.

For instance, EP-A 332326 discloses aqueous, self-crosslinking coating systems, the binder of which consists of a polyurethane containing carbonyl groups and a polyacrylate containing carbonyl groups, which are crosslinked with adipic acid dihydrazide. The disadvantage of this system is the lower crosslinking density, since the adipic acid dihydrazide can only react twice and the corresponding crosslinking reaction is reversible.

According to WO 2016/000989, one- or two-component coating compositions are disclosed comprising specific two-stage dispersion polymers and optionally also a polyurethane as binder. In the case that the two-stage dispersion polymers have keto, aldehyde and/or acetoacetoxy-carbonyl groups, it is pointed out that the coating compositions may additionally also comprise crosslinking agents such as, inter alia, organic compounds having two or more hydrazide groups, such as adipic acid dihydrazide, oxalic acid dihydrazide, phthalic acid hydrazide and terephthalic acid hydrazide.

It was therefore an object of the present invention to provide aqueous binder formulations based on acryloyloxy group-functionalized polyurethanes which do not comprise any aldehydic and/or ketonic carbonyl groups, which are storage-stable, are able to be cured both with exposure to and in the absence of high-energy radiation, and form coatings with high levels of crosslinking density or with high pendulum hardness.

The object was achieved by providing the binder formulation defined at the outset.

An essential component of the binder formulation according to the invention is a polyurethane A, which can be obtained by reacting
- a1) at least one diisocyanate and/or polyisocyanate (component A1) with
- a2) at least one organic compound having at least two hydroxyl groups, which differs from components A3 and A4 (component A2),
- a3) at least one organic compound having at least one group reactive to an isocyanate group and at least one dispersing group or at least one functional group which can be converted to a dispersing group and which differs from components A2 and A4 (component A3),
- a4) at least one organic compound having at least one group reactive to an isocyanate group and at least one optionally substituted acryloyloxy group, which differs from components A2 and A4 (component A4),
- a5) optionally at least one organic compound having only one group reactive to an isocya-nate group, which differs from components A3 and A4 (component A5), and
- a6) optionally at least one organic compound having at least two groups reactive to an isocyanate group, which differs from components A2 to A4 (component A6), wherein none of the components A1 to A6 comprises one or more aldehydic and/or ketonic carbonyl groups.

Component A1 is at least one diisocyanate and/or polyisocyanate.

In this case, the diisocyanates or polyisocyanates used can be either aromatic or aliphatic in structure, aliphatic diisocyanates or polyisocyanates being preferred.

Aromatic diisocyanates or polyisocyanates are those comprising at least one aromatic ring system, i.e. both purely aromatic and araliphatic compounds.

In the case of the aliphatic diisocyanates or polyisocyanates, both acyclic and cycloaliphatic compounds are suitable.

Cycloaliphatic diisocyanates or polyisocyanates are those comprising at least one cycloaliphatic ring system, while acyclic diisocyanates or polyisocyanates exclusively comprise straight-chain or branched non-cyclic hydrocarbon radicals. Aliphatic diisocyanates or polyisocyanates do not comprise any aromatic ring systems.

The diisocyanates that can be used in accordance with the invention have only two isocya-nate groups, whereas the polyisocyanate compounds have more than two isocyanate groups. In accordance with the invention, however, it is important that component A1 should also include the reaction products of the diisocyanates or polyisocyanates with themselves (oligomerization reactions of the isocyanate groups).

Examples of diisocyanates according to the invention are acyclic diisocyanates such as tet-ramethylene diisocyanate, pentamethylene diisocyanate, hexamethylene diisocyanate (1,6-diisocyanatohexane), octamethylene diisocyanate, decamethylene diisocyanate, dodeca-methylene diisocyanate, tetradecamethylene diisocyanate, derivatives of lysine diisocyanate (e.g. methyl or ethyl 2,6-diisocyanatohexanoate), trimethylhexyl diisocyanate or tetra-methylhexyl diisocyanate, cycloaliphatic diisocyanates such as 1,4-, 1,3- or 1,2-diisocya-natocyclohexane, 4,4'- or 2,4'-di(isocyanatocyclohexyl)methane, 1-isocyanato-3,3,5-trime-thyl-5-(isocyanatomethyl)cyclohexane (isophorone diisocyanate), 1,3- or 1,4-bis(isocy-anatomethyl)cyclohexane or 2,4-, or 2,6-diisocyanato-1-methylcyclohexane, and also 3 (or 4), 8 (or 9)-bis-(isocyanatomethyl)tricyclo[5.2.1.0$^{2,6}$]decane isomer mixtures, and also aromatic and araliphatic diisocyanates such as tolylene 2,4- or 2,6-diisocyanate and the isomer mixtures thereof, m- or p-xylylene diisocyanate, diphenylmethane diisocyanate (MDI), especially diphenylmethane 2,2'-diisocyanate (2,2'-MDI), diphenylmethane 2,4'-diisocyanate (2,4'-MDI) or diphenylmethane 4,4'-diisocyanate (4,4'-MDI) and the isomer mixtures thereof, phenylene 1,3- or 1,4-diisocyanate, 1-chlorophenylene 2,4-diisocyanate, naphthylene 1,5-diisocyanate, diphenylene 4,4'-diisocyanate, 4,4'-diisocyanato-3,3'-dimethylbi-phenyl, 3-methyldiphenylmethane 4,4'-diisocyanate, α, α, α ', α'-tetramethyl-m-xylylene diisocyanate, 1,4 diisocyanatobenzene or diphenyl ether 4,4'-diisocyanate.

Particular preference is given to aliphatic diisocyanates, hexamethylene diisocyanate, pentamethylene diisocyanate and isophorone diisocyanate being particularly preferred.

Examples of polyisocyanates are triisocyanates such as triisocyanatononane, 2'-isocya-natoethyl 2,6-diisocyanatohexanoate, 2,4,6-triisocyanatotoluene, triphenylmethane triisocy-anate or 2,4,4'-triisocyanatodiphenyl ether, or the mixtures of diisocyanates, triisocyanates, and higher polyisocyanates that are obtained, for example, by phosgenating corresponding aniline/formaldehyde condensates and constitute polyphenyl polyisocyanates having methylene bridges.

It is also significant that the polyisocyanates usable in accordance with the invention are also to include the oligomerization products of the aforementioned diisocyanates, which generally have an average NCO functionality of at least 2, but this may be up to 8. The average NCO functionality is preferably in the range from 2 to 5 and more preferably in the range from 2.4 to 4. The content of isocyanate groups after the oligomerization, calculated as NCO=42 g/mol, is generally in the range from 5% to 50% by weight.

In accordance with the invention, however, the following polyisocyanates are also included as component A1:
1) Polyisocyanates having isocyanurate groups and deriving from aromatic, acyclic or cycloaliphatic diisocyanates. Particularly preferred here are the corresponding acyclic or cycloaliphatic isocyanatoisocyanurates and in particular those based on hexamethylene diisocyanate and isophorone diisocyanate. The isocyanurates present are, in particular, tris(isocyanatoalkyl) and/or tris(isocyanatocycloalkyl) isocyanurates, which constitute cyclic trimers of the diisocyanates, or are mixtures with their higher homologs having more than one isocyanurate ring. The isocyanatoisocyanurates generally have an NCO content of 10 to 30% by weight, in particular 15 to 25% by weight, and an average NCO functionality of 2.6 to 8. Particular preference is given to the isocyanatoisocyanurate of hexamethylene diisocyanate.

The polyisocyanates having isocyanurate groups may, to a smaller degree, also comprise urethane and/or allophanate groups, preferably with a content of bound alcohol of less than 2% by weight, based on the polyisocyanate.

2) Polyisocyanates having uretdione groups, with aromatically, acyclically or cycloaliphatically bonded isocyanate groups, preferably acyclically or cycloaliphatically bonded, and in particular those derived from hexamethylene diisocyanate or isophorone diisocyanate. Uretdione diisocyanates are cyclic dimerization products of diisocyanates. The polyisocyanates having uretdione groups are frequently obtained in a mixture with other polyisocyanates, especially those mentioned under 1). Polyisocyanates having uretdione groups typically have functionalities in the range from 2 to 3.

3) Polyisocyanates having biuret groups, with aromatically, cycloaliphatically or acyclically bonded, preferably cycloaliphatically or acyclically bonded, isocyanate groups, especially tris(6-isocyanatohexyl)biuret or mixtures thereof with higher homologs thereof. These polyisocyanates having biuret groups generally have an NCO content in the range from 18% to 24% by weight and an average NCO functionality in the range from 2.8 to 6.

4) Polyisocyanates having urethane and/or allophanate groups, with aromatically, acyclically or cycloaliphatically bonded, preferably acyclically or cycloaliphatically bonded, isocyanate groups, such as, for example, by reaction of excess amounts of diisocyanate, for example hexamethylene diisocyanate or isophorone diisocyanate, with mono- or polyhydric alcohols. These polyisocyanates having urethane and/or allophanate groups generally have an NCO content in the range from 12% to 24% by weight and an average NCO functionality in the range from 2.0 to 4.5. These polyisocyanates having urethane and/or allophanate groups frequently occur in mixed forms with the polyisocyanates mentioned under 1).

5) Polyisocyanates comprising oxadiazinetrione groups, derived preferably from hexamethylene diisocyanate or isophorone diisocyanate. Such polyisocyanates comprising oxadiazinetrione groups are obtainable from diisocyanate and carbon dioxide.

6) Polyisocyanates comprising iminooxadiazinedione groups, derived preferably from hexamethylene diisocyanate or isophorone diisocyanate. Such polyisocyanates comprising iminooxadiazinedione groups are preparable from diisocyanates by means of specific catalysts.

7) Uretonimine-modified polyisocyanates.

8) Carbodiimide-modified polyisocyanates.

9) Hyperbranched polyisocyanates, of the kind known for example from DE-A 10013186 or DE-A 10013187.

10) Polyurethane/polyisocyanate prepolymers, from di- and/or polyisocyanates with alcohols.

11) Polyurea-polyisocyanate prepolymers.

12) The polyisocyanates 1) to 11), preferably 1), 3), 4) and 6), after preparation thereof, can be converted to polyisocyanates having biuret groups or urethane/allophanate groups, with aromatically, cycloaliphatically or acyclically bonded, preferably cycloaliphatically or acyclically bonded, isocyanate groups. Biuret groups are formed, for example, by addition of water or reaction with amines. Urethane and/or allophanate groups are formed by reaction with monohydric, dihydric or polyhydric, preferably monohydric, alcohols, optionally in the presence of suitable catalysts. These polyisocyanates having biuret or urethane/allophanate groups generally have an NCO content in the range from 10% to 25% by weight and an average NCO functionality in the range from 3 to 8.

13) Hydrophilically modified polyisocyanates, i.e. polyisocyanates which, as well as the groups described under 1) to 12), comprise those which arise in a formal sense through addition of molecules having NCO-reactive groups and hydrophilizing groups onto the isocyanate groups of the above molecules. The latter are nonionic groups such as alkyl polyethylene oxide and/or ionic groups derived from phosphoric acid, phosphonic acid, sulfuric acid or sulfonic acid, or salts thereof.

14) Modified polyisocyanates for dual-cure applications, i.e. polyisocyanates which, as well as the groups described under 1) to 11), comprise those which arise in a formal sense through addition of molecules having NCO-reactive groups and groups crosslinkable by high-energy radiation, such as in particular UV or actinic radiation, onto the isocyanate groups of the above molecules. These molecules are, for example, hydroxyalkyl (meth)acrylates and other hydroxyl-vinyl compounds.

In a preferred embodiment, the diisocyanate or polyisocyanate used is isophorone diisocyanate, the isocyanatoisocyanurate of hexamethylene diisocyanate and/or double bond-containing allophonates based on hexamethylene diisocyanate, which is marketed for example by BASF SE under the product name Laromer® 9000.

In the case of aromatic diisocyanates or polyisocyanates, in one embodiment it is advantageous to use 2,2'-MDI, 2,4'-MDI, 4,4'-MDI and/or oligomeric MDI, which consists of higher-nuclear homologs of MDI, which have at least 3 aromatic nuclei and have an isocyanate functionality of >2, or crude MDI, which is obtained in the production of MDI. In a further embodiment, mixtures of at least one oligomer of MDI and at least one of the aforementioned low molecular weight MDI derivatives 2,2'-MDI, 2,4'-MDI or 4,4'-MDI (such mixtures are also referred to as polymeric MDI) are used.

The (average) functionality of a polyisocyanate comprising polymeric MDI can vary in the range from about 2.2 to about 4, in particular from 2.5 to 3.8 and in particular from 2.7 to 3.5. Such a mixture of MDI-based polyfunctional isocyanates having different functionalities is, in particular, the crude MDI obtained as intermediate in the preparation of MDI.

Polyfunctional isocyanates or mixtures of a plurality of polyfunctional isocyanates based on MDI are known and are sold, for example, by BASF Polyurethanes GmbH under the Lupranat® M20 or Lupranat® M50 name.

In a preferred embodiment, component A1 used is at least one aliphatic diisocyanate and/or polyisocyanate i, wherein particular preference is given to isophorone diisocyanate and/or the isocyanatoisocyanurate of hexamethylene diisocyanate.

An organic compound having at least two hydroxyl groups is used as component A2 according to the invention. In this case, at least one molecular compound having a molecular weight≤500 g/mol and/or at least one polymeric compound having an average molecular weight>500 g/mol can be used as component A2.

The organic compounds used having at least two hydroxyl groups can be both aromatic and aliphatic in structure, preference being given to those having an aliphatic structure.

Aromatic molecular and/or polymeric compounds having at least two hydroxyl groups are those which comprise at least one aromatic ring system, i.e. both purely aromatic and araliphatic compounds.

In the case of the aliphatic molecular and/or polymeric compounds having at least two hydroxyl groups, both acyclic and cycloaliphatic compounds are suitable.

Cycloaliphatic molecular and/or polymeric compounds having at least two hydroxyl groups are those that comprise at least one cycloaliphatic ring system, whereas acyclic organic molecular and/or polymeric compounds having at least two hydroxyl groups have exclusively straight-chain or branched non-cyclic hydrocarbon radicals. Aliphatic molecular and/or polymeric compounds having at least two hydroxyl groups do not comprise any aromatic ring systems.

Those compounds which have only two hydroxyl groups are preferred as molecular component A2, aliphatic diols being particularly preferred.

Examples of molecular acyclic components A2 include: ethylene glycol, propane-1,2-diol, propane-1,3-diol, butane-1,2-diol, butane-1,3-diol, butane-1,4-diol, butane-2,3-diol, pentane-1,2-diol, pentane-1,3-diol, pentane-1,4-diol, pentane-1,5-diol, pentane-2,3-diol, pentane-2,4-diol, hexane-1,2-diol, hexane-1,3-diol, hexane-1,4-diol, hexane-1,5-diol, hexane-1,6-diol, hexane-2,5-diol, heptane-1,2-diol, heptane-1,7-diol, octane-1,8-diol, octane-1,2-diol, nonane-1,9-diol, decane-1,2-diol, decane-1,10-diol, dodecane-1,2-diol, dodecane-1,12-diol, 1,5-hexadiene-3,4-diol, 2,2-dimethylpropane-1,3-diol (neopentyl glycol), 2-methylpentane-2,4-diol, 2,4-dimethylpentane-2,4-diol, 2-ethylhexane-1,3-diol, 2,5-dimethylhexane-2,5-diol, 2,2,4-trimethylpentane-1,3-diol, pinacol, diethylene glycol, triethylene glycol, dipropylene glycol and/or tripropylene glycol.

Molecular acyclic components A2 used with preference are ethylene glycol, propane-1,2-diol, propane-1,3-diol, butane-1,4-diol, pentane-1,5-diol, hexane-1,6-diol and/or octane-1,8-diol.

Examples of cycloaliphatic diols are cyclopentane-1,2- and -1,3-diols, cyclohexane-1,2-, -1,3- and -1,4-diols, 1,1-, 1,2-, 1,3- and 1,4-bis(hydroxymethyl)cyclohexanes, 1,1-, 1,2-, 1,3- and 1,4-bis(hydroxyethyl)cyclohexanes, isosorbide and bis(4-hydroxycyclohexane)isopropylidene.

Preference is given to cyclohexane-1,2-, -1,3- and -1,4-diol, 1,3- and 1,4-bis(hydroxyme-thyl)cyclohexane and bis (4-hydroxycyclohexane)isopropylidene.

Components A2 having more than two hydroxyl groups include, for example: trimethylol-butane, trimethylolpropane, trimethylolethane, pentaerythritol, glycerol, ditrimethylolpropane, dipentaerythritol, ditrimethylolethane, sorbitol, mannitol, diglycerol, threitol, erythritol, adonitol (ribitol), arabitol (lyxitol), xylitol, dulcitol (galactitol), maltitol or isomaltitol.

The polymeric component A2 that may be used is advantageously a polyesterol, a polyetherol and/or a polycarbonatol, the OH number of which, measured analogously to DIN EN ISO 4629-1, is in the range 40 and 200 mg KOH/g of polymer and the acid number of which, measured in accordance with DIN 53240, is in the range<20 mg KOH/g of polymer. Here, in a deviation from DIN EN ISO 4629-1, when determining the OH number, the temperature is 95° C. instead of just 50° C. AH other measures are carried out as described in DIN EN ISO 4629-1. The weight-average molecular weights of the aforementioned polymeric components A2 are advantageously in the range>400 and 5000 g/mol and particularly advantageously in the range 500 and 2000 g/mol. In the context of this document, the weight-average molecular weights are determined by gel permeation chromatography using calibrated standards.

The polyetherols that may be used in accordance with the invention are advantageously essentially polyalkylene oxides of the general formula HO[AO]$_n$H, where AO is ethylene oxide, propylene oxide, 1,2-epoxybutane and/or 2,3-epoxybutane and n is a number 7. In the preparation thereof, the alkylene oxides can in each case be used individually and/or as a mixture by acid- or base-catalyzed reaction with water, wherein polyalkylene glycols which are formed from only one alkylene oxide, such as in particular polyethylene glycols or polypropylene glycols, or are formed from two or more alkylene oxides, are formed, wherein the polyalkylene glycols obtained thereby comprise the respective two or more alkylene oxides—depending on the preparation variant—in a statistical mixture or in the form of blocks. The polyetherols which may be used according to the invention also include polytetramethylene glycols, which are accessible by acid-catalyzed polymerization of tetrahydrofuran. Those skilled in the art are familiar with the corresponding methods of preparation of the aforementioned polyetherols.

Polycarbonatols, i.e. hydroxy-functionalized polycarbonates, are accessible, inter alia, by reacting the aforementioned molecular diol components A2, in particular the aliphatic diol components A2 and particularly preferably the acyclic diol components A2, with phosgene or diethyl carbonate or dimethyl carbonate, with removal of hydrochloric acid or of ethanol or methanol.

In accordance with the invention, polycarbonatols based on ethylene glycol, neopentyl glycol, 1,4-butanediol, 1,6-hexanediol, 1,4-cyclohexanedimethanol, bisphenol A and/or bisphenol S are advantageously used as polymeric component A2.

The polyesterols that may be used as polymeric component A2 according to the invention are in principle accessible by reacting monomeric or polymeric diols with dicarboxylic acid components, polyesterols based on monomeric aliphatic diols, in particular based on monomeric acyclic diols, being advantageous.

The dicarboxylic acid units may be the free dicarboxylic acids or derivatives thereof.

Derivatives are preferably understood to mean
  the corresponding anhydrides in monomeric or else polymeric form,
  monoalkyl or dialkyl esters, preferably mono- or di-$C_1$-$C_4$alkyl esters, more preferably monomethyl or dimethyl esters or the corresponding monoethyl or diethyl esters,
  additionally monovinyl and divinyl esters, and also
  mixed esters, preferably mixed esters with different $C_1$-$C_4$-alkyl components, more preferably mixed methyl ethyl esters.

In the context of this document, $C_1$-$C_4$ alkyl denotes methyl, ethyl, isopropyl, n-propyl, n-butyl, isobutyl, sec-butyl and tert-butyl, preferably methyl, ethyl and n-butyl, more preferably methyl and ethyl, and very preferably methyl.

Examples of molecular acyclic diols include: ethylene glycol, propane-1,2-diol, propane-1,3-diol, butane-1,2-diol, butane-1,3-diol, butane-1,4-diol, butane-2,3-diol, pentane-1,2-diol, pentane-1,3-diol, pentane-1,4-diol, pentane-1,5-diol, pentane-2,3-diol, pentane-2,4-diol, hexane-1,2-diol, hexane-1,3-diol, hexane-1,4-diol, hexane-1,5-diol, hexane-1,6-diol, hex-ane-2,5-diol, heptane-1,2-diol, heptane-1,7-diol, octane-1,8-diol, octane-1,2-diol, nonane-1,9-diol, decane-1,2-diol, decane-1,10-diol, dodecane-1,2-diol, dodecane-1,12-diol, 1,5-hex-adiene-3,4-diol, 2,2-dimethylpropane-1,3-diol, 2-methylpentane-2,4-diol, 2,4-dimethylpentane-2,4-diol, 2-ethylhexane-1,3-diol, 2,5-dimethylhexane-2,5-diol, 2,2,4-trimethylpentane-1,3-diol, pinacol, diethylene glycol, triethylene glycol, dipropylene glycol and/or tripropylene glycol.

Molecular acyclic diols used with preference are ethylene glycol, propane-1,2-diol, propane-1,3-diol, butane-1,4-diol, pentane-1,5-diol, hexane-1,6-diol, 2,2-dimethylpropane-1,3-diol and/or octane-1,8-diol.

Examples of cycloaliphatic diols are cyclopentane-1,2- and -1,3-diols, cyclohexane-1,2-, -1,3- and -1,4-diols, 1,1-, 1,2-, 1,3- and 1,4-bis(hydroxymethyl)cyclohexanes, 1,1-, 1,2-, 1,3- and 1,4-bis(hydroxyethyl)cyclohexanes and bis(4-hydroxycyclohexane)isopropylidene.

Preferred cycloaliphatic diols are cyclohexane-1,2-, -1,3- and -1,4-diol, 1,3- and 1,4-bis(hy-droxymethyl)cyclohexane and bis(4-hydroxycyclohexane)isopropylidene.

The polymeric diols are essentially the polyalkylene oxides of the general formula HO[AO]$_n$H described above, where AO is ethylene oxide, propylene oxide, 1,2-epoxybutane and/or 2,3-epoxybutane and n is a number 7. If such polymeric diols are used to prepare the polyesterols, the corresponding polyethylene glycols are used in particular.

To prepare the polyesterols advantageous according to the invention, however, preference is given to using the acyclic diols ethylene glycol, propane-1,2-diol, propane-1,3-diol, bu-tane-1,4-diol, pentane-1,5-diol, hexane-1,6-diol, 2,2-di-methylpropane-1,3-diol and/or octane-1,8-diol.

In the case of the dicarboxylic acid units, it is advantageous to use the free dicarboxylic acids or anhydrides thereof, it being possible for these to have either an aromatic or an aliphatic structure. In the case of the aliphatic dicarboxylic acids, both those with an acyclic structure and those with a cycloaliphatic structure are used.

Examples of dicarboxylic acids having an acyclic structure are $C_2$-$C_{16}$-diacids such as, in particular, oxalic acid, malonic acid, maleic acid, fumaric acid, succinic acid, glutaric acid, adipic acid, pimelic acid, suberic acid, azelaic acid, sebacic acid, undecanedioic acid, dodec-anedioic acid.

Examples of cycloaliphatic dicarboxylic acids are cis- and trans-cyclohexane-1,2-dicarboxylic acid (hexahydrophthalic acids), cis- and trans-cyclohexane-1,3-dicarboxylic acid, cis- and trans-cyclohexane-1,4-dicarboxylic acid, 1,2-, 1,3- or 1,4-cyclohex-4-enedicarboxylic acid (tetrahydrophthalic acids), cis- and trans-cyclopentane-1,2-dicarboxylic acid, cis- and trans-cyclopentane-1,3-dicarboxylic acid.

Examples of aromatic dicarboxylic acids are phthalic acid, isophthalic acid, terephthalic acid and phthalic anhydride, preference being given to phthalic acid and isophthalic acid, particular preference to phthalic acid.

Dicarboxylic acid units advantageously used are succinic acid, adipic acid, sebacic acid, maleic acid, fumaric acid, phthalic acid, isophthalic acid, terephthalic acid and/or phthalic anhydride.

According to the invention, particularly advantageous are polyesterols based on hexane-1,6-diol, ethylene glycol, propylene-1,2-diol and/or neopentyl glycol as the diol component and adipic acid, phthalic acid, isophthalic acid and/or sebacic acid as the dicarboxylic acid component, wherein polyesterols based on hexane-1,6-diol, adipic acid and isophthalic acid, hexane-1,6-diol, adipic acid and phthalic acid and/or on propylene-1,2-diol, butane-1,4-diol and adipic acid.

It is important, however, that the polyesterols can also comprise, to a lesser extent, monocarboxylic acids, such as oleic acid, and alcohols with higher functionality, such as trimethylolpropane or pentaerythritol, as additional building blocks.

At least one organic compound having at least one group reactive to an isocyanate group and at least one dispersing group or at least one functional group which can be converted to a dispersing group is used as component A3 according to the invention.

Possible components A3 are therefore those having the general formula

RG-R$^1$-DG, where

RG is at least one group reactive to an isocyanate group,

R$^1$ is an acyclic, cycloaliphatic or aromatic radical having 1 to 20 carbon atoms, and DG is at least one dispersing group.

Examples of groups RG which are reactive to an isocyanate group are in particular —OH, —SH, —NH$_2$ or —NHR$^2$, where R$^2$ has the definition specified for R', but can be different from the radical used there. Groups reactive to an isocyanate group are preferably —OH or —NH$_2$, wherein the OH group is especially preferred.

DG is advantageously an acid group, in particular a carboxylic acid group (—COOH), a sulfonic acid group (—SO$_3$H) or a phosphorous acid group (—PO$_3$H), wherein the carboxylic acid group and the sulfonic acid group are preferred and the carboxylic acid group is particularly preferred, and also the anionic forms thereof which, according to the invention, can be associated with any alkali metal ion or the ammonium ion as counterion, for example Li+, Na+, K+ or NH$_4^+$.

R$^1$ is, for example, methylene, 1,2-ethylene, 1,2-propylene, 1,3-propylene, 1,2-butylene, 1,4-butylene, 1,3-butylene, 1,6-hexylene, 1,8-octylene, 1,12-dodecylene, 1,2-phenylene, 1,3-phenylene, 1,4-phenylene, 1,2-naphthylene, 1,3-naphthylene, 1,4-naphthylene, 1,6-naphthylene, 1,2-cyclopentylene, 1,3-cyclopentylene, 1,2-cyclohexylene, 1,3-cyclohexylene or 1,4-cyclohexylene.

In one embodiment, component A3 is therefore a compound which has at least one isocya-nate-reactive group and at least one acid group as a dispersing group.

Components A3 of this kind are, for example, hydroxyacetic acid, tartaric acid, lactic acid, 3-hydroxypropionic acid, hydroxypivalic acid, mercaptoacetic acid, mercaptopropionic acid, thiolactic acid, mercaptosuccinic acid, glycine, iminodiacetic acid, sarcosine, alanine, α-alanine, leucine, isoleucine, aminobutyric acid, hydroxysuccinic acid, hydroxydecanoic acid, ethylenediaminetriacetic acid, hydroxydodecanoic acid, hydroxyhexadecanoic acid, 12-hydroxystearic acid, aminonaphthalenecarboxylic acid, hydroxyethanesulfonic acid, hydroxy-propanesulfonic acid, mercaptoethanesulfonic acid, mercaptopropanesulfonic acid, amino-methanesulfonic acid, taurine, aminopropanesulfonic acid, N-alkylated or N-cycloalkylated aminopropanesulfonic or aminoethanesulfonic acids, examples being N-cyclohexylami-noethanesulfonic acid or N-cyclohexy-laminopropanesulfonic acid, and also the alkali metal, alkaline earth metal or ammonium salts thereof, and with particular preference the stated monohydroxycarboxylic and monohydroxysulfonic acids, and also monoaminocarboxylic and monoaminosulfonic acids.

To produce polyurethane A, the aforementioned acids, if they are not already salts, are partially or completely neutralized with a base, such as in particular an alkali metal hydroxide or tertiary amines such as triethylamine, tri-n-butylamine, methyldiethanolamine or di-methyletha-nolamine.

Components A3 also include the polyethoxylates of the following formula

RG-EO$_x$-C$_1$-C$_4$-alkyl, where

RG has the definition stated above and is in particular the OH group,

EO is the —CH$_2$—CH$_2$—O— group, and x is a number ≥4 and ≤100 and particularly advantageously a number ≥8 and ≤60.

Components A3 also include the compounds of the following formula

RG-R$^1$-RG*-R$^{1*}$-DG, where

RG has the definition stated above and is in particular the NH$_2$ group,

R¹ has the definition stated above and is in particular 1,2-ethylene, 1,2-propylene, 1,3-propylene, 1,2-butylene, 1,4-butylene, 1,3-butylene and particularly preferably 1,2-ethylene, RG* is —O—, —S—, —NH— or —NR²— and is in particular —NH—, where R² has the definition stated above, R¹* has the definition stated for R' but can be different from the radical used there and is in particular 1,2-ethylene, 1,2-propylene, 1,3-propylene, 1,2-butylene, 1,4-butylene, 1,3-butylene and particularly preferably 1,2-ethylene and DG has the definition stated above and is in particular the carboxylic acid group and the sulfonic acid group or the salts thereof mentioned.

Corresponding products and the preparation thereof are familiar to those skilled in the art and are available on the market, for example diaminoalkanesulfonates and deaminoalkan-ecarboxylic acids, such as, for example, (2-aminoethyl)-2-aminoethanesulfonic acid, (2-aminoethyl)-3-aminopropanoic acid or (4-aminobutyl)-3-aminopropanoic acid.

Possible, albeit less preferred, components A3 comprise exactly one isocyanate-reactive group, and at least one hydrophilic group which is anionic or can be converted to an anionic group. These are, for example, those as described in EP-A 703255, therein especially from page 3, line 54 to page 4, line 38, in DE-A 19724199, therein especially from page 3, lines 4 to 30, in DE-A 4010783, therein especially from column 3, lines 3 to 40, in DE-A 4113160, therein especially from column 3, line 63 to column 4, line 4 and in EP-A 548669, therein especially from page 4, line 50 to page 5, line 6. These documents are hereby expressly incorporated by reference as part of the present disclosure content.

In a preferred embodiment, component A3 has at least one hydroxyl and/or at least one primary amino group as the at least one group reactive to an isocyanate group and has an acid group as the at least one dispersing group, the carboxylic acid group being particularly preferred.

In a preferred embodiment, component A3 is a compound having exactly two hydroxyl groups and exactly one acid group, the carboxylic acid group being particularly preferred.

Examples of the preferred carboxylic acids having two hydroxyl groups are 2,2-(dime-thylol)propionic acid, 2,2-(dimethylol)butyric acid and 2,2-(dimethylol)pentanoic acid, wherein 2,2-(dimethylol)propionic acid and 2,2-(dimethylol)butyric acid are particularly preferred and 2,2-(dimethylol)propionic acid is especially preferred.

Component A4, which is essential for polyurethane A, is at least one organic compound having at least one group reactive to an isocyanate group and at least one optionally substituted acryloyloxy group.

Component A4 is at least one compound having at least one, preferably one or two group(s) reactive to an isocyanate group and at least one, preferably one or two optionally substituted acryloyloxy group(s).

Components A4 can therefore be, for example, monoesters of α, β-unsaturated carboxylic acids, such as acrylic acid, methacrylic acid, crotonic acid or mono- or diesters of α, β-unsaturated dicarboxylic acid, such as itaconic acid, fumaric acid, maleic acid, or acrylami-doglycolic acid or methacrylamidoglycolic acid, with diols or polyols which preferably have 2 to 20 carbon atoms and at least two hydroxyl groups, such as ethylene glycol, diethylene glycol, triethylene glycol, 1,2-propylene glycol, 1,3-propylene glycol, 1,1-dimethyl-1,2-ethanediol, dipropylene glycol, triethylene glycol, tetraethylene glycol, pentaethylene glycol, tripropylene glycol, 1,2-, 1,3- or 1,4-butanediol, pentane-1,5-diol, neopentyl glycol, hexane-1,6-diol, 2-methylpentane-1,5-diol, 2-ethylbutane-1,4-diol, 1,4-(dimethylol) cyclohexane, 2,2-bis(4-hydroxycyclohexyl)propane, glycerol, trimethylolethane, trimethylolpropane, trime-thylolbutane, pentaerythritol, ditrimethylolpropane, erythritol, sorbitol, poly-tetrahydrofuran having a molecular weight between 162 and 2000, poly-1,3-propanediol having a molecular weight between 134 and 400 or polyethylene glycol having a molecular weight between 238 and 458. In addition, esters or amides of (meth)acrylic acid with amino alcohols, such as, for example, 2-aminoethanol, 2-(methylamino)ethanol, 3-aminopropanol, 1-aminopropan-2-ol or 2-(2-aminoethoxy)ethanol or polyaminoalkanes, such as ethylenediamine or diethylenetriamine or vinyl acetic acid, can also be used as component A4.

Examples of amides of ethylenically unsaturated carboxylic acids with amino alcohols are hydroxyalkyl(meth)acrylamides such as N-hydroxymethylacrylamide, N-hydroxymethyl-methacrylamide, N-hydroxyethylacrylamide, N-hydroxyethylmethacrylamide, 5-hydroxy-3-oxapentyl (meth)acrylamide, N-hydroxyalkylcrotonamides such as N-hydroxymethylcrotona-mide, or N-hydroxyalkylmaleimides such as N-hydroxyethylmaleimide.

In one embodiment, compounds of the following formula are used as components A4

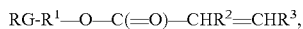

where

RG has the definition stated above and is in particular the OH group,

R¹ has the definition stated above and is in particular 1,2-ethylene, 1,2-propylene, 1,3-propylene, 1,2-butylene, 1,4-butylene, 1,3-butylene and particularly preferably 1,2-ethylene, R² is hydrogen, $C_1$-$C_4$-alkyl, —C(=O)—$C_1$-$C_4$-alkyl or —CH₂—C(=O)—$C_1$-$C_4$-alkyl, preferably hydrogen and methyl and particularly preferably hydrogen, and R³ is hydrogen, $C_1$-$C_4$-alkyl, —C(=O)—O—$C_1$-$C_4$-alkyl or —C≡N and preferably hydrogen.

In a preferred embodiment, component A4 is selected from the group consisting of 2-hydroxyethyl acrylate, 2-hydroxyethyl methacrylate, 2- or 3-hydroxypropyl acrylate, butane-1,4-diol monoacrylate, 1,2- or 1,3-diacrylate of glycerol, trimethylolpropane diacrylate, pentaerythrityl triacrylate, ditrimethylolpropane triacrylate and dipentaerythrityl pentaacrylate, preferably from 2-hydroxyethyl acrylate and 2-hydroxyethyl methacrylate, and is more preferably 2-hydroxyethyl acrylate.

In a further preferred embodiment, component A4 is an epoxy (meth)acrylate having at least two, for example two to four, preferably two to three and particularly preferably exactly two, hydroxyl groups and as many (meth)acrylate groups. In the context of this document, a (meth)acrylate group is to be understood to mean a methacrylate [—O—C(=O)—C(CH₃)=CH₂] and/or acylate group [—O—C(=O)—CH=CH₂].

Advantageously, epoxy (meth)acrylates are accessible by reacting an epoxy compound with acrylic acid and/or methacrylic acid to form a β-hydroxyalkyl (meth)acrylate group.

Epoxy (meth)acrylates are preferably reaction products of glycidyl ethers with (meth)acrylic acid.

In this case, the glycidyl ethers of aliphatic or aromatic polyols are particularly suitable. A large number of products of this kind are supplied commercially. Particular preference is given to polyglycidyl compounds of the bisphenol A, F or B type, the fully hydrogenated derivatives thereof, and glycidyl ethers of polyhydric alcohols such as butane-1,4-diol, 1,4-(di-methylol)cyclohexane, neopentyl glycol, hexane-1,6-diol, glycerol, trimethylolpropane or pentaerythritol. Examples of polyepoxide commercial products are Epikote® 812 (epoxy value: ca. 0.67 mol/100 g) and Epikote® 828 (epoxy value: ca. 0.53 mol/100 g), Epikote® 1001, Epikote® 1007 and Epikote® 162 (epoxy value: ca. 0.61 mol/100 g) from Resolution Performance Products or Rütapox® 0162 (epoxy value: ca. 0.58 mol/100 g), Aradit® DY 0397 (epoxy value: ca. 0.83 mol/100 g) from Vantico AG.

Particular preference is given to bisphenol A diglycidyl ether and 1,4-butanediol diglycidyl ether, bisphenol A diglycidyl ether being especially preferred.

In a further preferred embodiment, component A4 is an epoxy (meth)acrylate of the formula

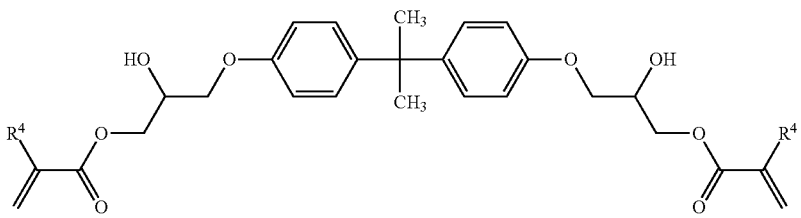

where
$R^4$ is hydrogen or methyl and preferably hydrogen.

It is generally applicable to component A4 that it advantageously has at least one hydroxyl group as the at least one group reactive to an isocyanate group and has at least one unsubstituted acryloyloxy group as the at least one optionally substituted acryloyloxy group.

When producing polyurethane A, at least one organic compound having only one group reactive to an isocyanate group, which differs from components A3 and A4, can be used as optional reaction component (component A5).

The optional components A5 that can be used are particularly compounds of the general formula

RG-R$^5$ where
RG has the definition stated above and is in particular the OH group, and
$R^5$ is a monovalent $C_1$-$C_{18}$-alkyl radical, $C_6$-$C_{12}$-aryl radical, $C_5$-$C_{12}$-cycloalkyl radical or a five- to six-membered heterocycle radical having at least one oxygen, nitrogen and/or sulfur atom, where this radical may still have functional groups such as $C_1$-$C_{18}$-alkyl, $C_6$-$C_{12}$-aryl, $C_5$-$C_{12}$-cycloalkyl, halogen or a five- to six-membered heterocycle groups which have at least one oxygen, nitrogen and/or sulfur atom and which are themselves incapable of reacting with an isocyanate group.

For example, suitable components A5 are monoalcohols such as methanol, ethanol, n-propanol, isopropanol, n-butanol, isobutanol, sec-butanol, the isomeric pentanols, hexanols, octanols and nonanols, n-decanol, n-dodecanol, n-tetradecanol, n-hexadecanol, n-octade-canol, cyclohexanol, cyclopentanol, the isomeric methylcyclohexanols or hydroxymethylcy-clohexane, 3-ethyl-3-hydroxymethyloxetane, or tetrahydrofurfuryl alcohol; aromatic alcohols such as phenol, the isomeric cresols or methoxyphenols, aralipathic alcohols such as benzyl alcohol, anisyl alcohol or cinnamyl alcohol; secondary monoamines such as dimethylamine, diethylamine, dipropylamine, diisopropylamine, di-n-butylamine, diisobutylamine, bis-(2-ethylhexyl)amine, N-methyl- and N-ethylcyclohexylamine or dicyclohexylamine, heterocyclic secondary amines such as morpholine, pyrrolidine, piperidine or 1H-pyrazole and also specific tert-amino alcohols such as 2-(dimethylamino)ethanol, 2-(diethylamino)ethanol, 2-di(isopropylamino)ethanol, 2-(di-n-butylamino)ethanol, 3-(dimethylamino)propanol or 2-(di-methylamino)propanol.

The optional component A5 used is advantageously at least one aliphatic $C_1$- to $C_6$-alcohol, such as, for example, methanol, ethanol, n-propanol, isopropanol, n-butanol, isobutanol, sec-butanol, the isomeric pentanols and also the isomeric hexanols, and/or a primary or secondary aliphatic amine, such as, for example, methylamine, ethylamine, n-proplyamine, n-butylamine, dimethylamine, diethylamine, di-n-propylamine or diisopropylamine, wherein preference is given to an aliphatic $C_1$- to $C_6$-alcohol and particular preference is given to methanol, n-propanol and/or n-pentanol.

In this context, it is important that the aforementioned optional components A5 are used essentially to reduce the number of reactive free isocyanate groups or to modify the properties of polyurethane A.

As further optional component in the production of polyurethane A, at least one organic compound having at least two groups reactive to an isocyanate group, which differs from components A2 to A4 can be used (component A6). In this case, particularly suitable groups reactive to an isocyanate group are the HS, $H_2N$ or $R^2HN$ groups, where $R^2$ has the definition stated above for $R^1$.

In this case, the at least one organic component A6 may be aliphatic or aromatic in structure, wherein the aliphatic or aromatic structural elements may also comprise heteroatoms such as oxygen, sulfur or nitrogen.

The at least one component A6 used is advantageously those aliphatic compounds which have at least one primary and/or at least one secondary amino group.

Examples of components A6 having two primary amino groups are $C_1$-$C_{20}$-alkylenediamines, such as ethylene-1,2-diamine, butylene-1,4-diamine, pentane-1,5-diamine, neopentyldia-mine and hexamethylenediamine, and also 4,9-dioxadodecane-1,12-diamine, 4,7,10-triox-atridecane-1,13-diamine, 4,4'-diaminodicyclohexylmethane and isophoronediamine and also amine-terminated polyalklylene diols based on homopolymers and/or copolymers of ethylene glycol and/or propylene glycol, having molecular weights in the range from 200 to 4000 g/mol.

Examples of components A6 having at least one primary and at least one secondary amino group are in particular 3-amino-1-methylaminopropane, diethylenetriamine, triethylenetet-ramine, dipropylenetriamine or N, N'-bis(3-aminopropyl)ethylenediamine.

If at least one optional component A6 is used to produce polyurethane A, isophoronediamine and/or diethylenetriamine are used in particular.

In this context, it is important that component A6 is used to increase the molar mass of polyurethane A, which in particular reduces the tackiness of the coatings obtained and in-creases the hardness thereof.

In accordance with the invention, components A1 to A6 are advantageously selected in type and amount such that the ratio of the sum of the equivalent amounts of the groups, reactive to an isocyanate group, of components A2 to A6 to the equivalent amount of the isocyanate groups of component A1 is in the range≥0.8 and ≤1.2 and preferably in the range≥0.9 and ≤1.1.

In accordance with the invention, polyurethane A is advantageously obtained by reacting
- ≥10 and ≤55% by weight of at least one component A1,
- ≥15 and ≤85% by weight of at least one component A2,
- ≥2 and ≤15% by weight of at least one component A3,
- ≥0 and ≤40% by weight of at least one component A4,
- ≥0 and ≥15% by weight of at least one component A5, and
- ≥0 and ≤5% by weight of at least one component A6, wherein the total amounts of components A1 to A6 add up to 100% by weight.

Polyurethane A for hard films is advantageously obtained by reacting
- ≥20 and ≤50% by weight of at least one component A1,
- ≥25 and ≤60% by weight of at least one component A2,
- ≥2 and ≤15% by weight of at least one component A3,
- ≥4 and ≤35% by weight of at least one component A4,
- ≥0 and ≤10% by weight of at least one component A5, and
- ≥0 and ≤5% by weight of at least one component A6, wherein the total amounts of components A1 to A6 add up to 100% by weight.

Polyurethane A for hard films is particularly advantageously obtained by reacting
- ≥20 and ≤50% by weight isophorone diisocyanate, hexamethylene diisocyanate, dicyclo-hexylmethane-4,4'-diisocyanate, isocyanurate based on hexamethylene diisocyanate and/or isocyanurate based on isophorone diisocyanate,
- ≥30 and ≤55% by weight butane-1,4-diol, polyesterol based on hexane-1,6-diol, adipic acid and isophthalic acid having a molecular weight in the range≥1000 and ≤2000 g/mol and/or polypropylene glycol having a molecular weight in the range≥1500 and ≤2500 g/mol,
- ≥2 and ≤10% by weight 2,2-(dimethylol)propionic acid, (2-aminoethyl)-3-aminopropanoic acid and/or polyethylene glycol monomethyl ether having a molecular weight in the range≥750 and ≤1250 g/mol,
- ≥5 and ≤30% by weight 2-hydroxyethyl acrylate, butane-1,4-diol diglycidyl ether diacrylate and/or bisphenol A diglycidyl ether diacrylate,
- ≥0 and ≤5% by weight methanol, n-propanol and/or n-pentanol (component A5), and
- ≥0 and ≤3% by weight isophoronediamine, diethylenetriamine and/or hexamethylenediamine, wherein the total amounts of components A1 to A6 add up to 100% by weight.

Polyurethane A for soft films is advantageously obtained by reacting
- ≥10 and ≤40% by weight of at least one component A1,
- ≥35 and ≤85% by weight of at least one component A2,
- ≥2 and ≤15% by weight of at least one component A3,
- ≥0.1 and ≤20% by weight of at least one component A4,
- ≥0 and ≤15% by weight of at least one component A5, and
- ≥0 and ≤1% by weight of at least one component A6, wherein the total amounts of components A1 to A6 add up to 100% by weight.

Polyurethane A for soft films is particularly advantageously obtained by reacting
- ≥10 and ≤40% by weight isophorone diisocyanate, hexamethylene diisocyanate and/or toluene diisocyanate,
- ≥40 and ≤85% by weight polypropylene glycol having a molecular weight in the range≥1000 and ≥4000 g/mol, polyesterol based on hexane-1,6-diol, adipic acid and sebacic acid having a molecular weight in the range≥1000 and ≤4000 g/mol and/or polyethylene/propylene glycol having a molecular weight in the range≥1000 and ≤4000 g/mol,
- ≥2 and ≤15% by weight 2,2-(dimethylol)propionic acid and/or polyethylene glycol monomethyl ether having a molecular weight in the range≥500 and ≤1250 g/mol,
- ≥0.1 and ≤20% by weight 2-hydroxyethyl acrylate, 2-hydroxyethyl methacrylate and/or bu-tane-1,4-diol diglycidyl ether diacrylate,
- ≥0 and ≤10% by weight methanol, ethanol, n-propanol and/or n-pentanol, and
- ≥0 and ≤0.5% by weight hexamethylenediamine, 2-aminoethanol and/or amine-terminated polypropylene glycols having a molecular weight in the range≥240 and ≤1000 g/mol wherein the total amounts of components A1 to A6 add up to 100% by weight.

The aforementioned molecular weights were generally determined by means of gel permeation chromatography using calibrated standards, which is familiar to those skilled in the art.

Polyurethane A is generally produced in such a way that components A1 to A5 are reacted with one another at a reaction temperature≥25 and ≤100° C. and advantageously≥40 and ≤90° C. over a period of ≥3 and ≤20 hours and advantageously≥5 and ≤12 hours in the absence of, but preferably in the presence of a catalyst, wherein at least a portion, advantageously the total amounts of the at least one component A1 to A5 are initially charged in a reactor together with the catalyst and are reacted with one another at the specified temperature. If the optional component A6 is to be used to increase the molecular weight, it is preferably added when the reaction mixture has reached a predetermined residual NCO content, for example 0.1 to 2% by weight. The reaction product obtained therefrom is advantageously neutralized with a tertiary amine or an aqueous alkali metal hydroxide solution. The amount of neutralizing agent used depends on the amount of acid component A3 used. Typically, 40 to 100 mol % of the acid groups used are neutralized. In an optional embodiment, a further component A6 is then added to the reaction mixture. The reaction mixture is then left to post-react for at least 15 minutes, preferably 30 minutes and particularly preferably 45 minutes at the specified reaction temperature.

Components A1 to A6 are advantageously reacted in the presence of a suitable catalyst. Such catalysts are known from the literature, for example from G. Oertel (ed.), Polyurethane [Polyurethanes], 3rd edition 1993, Cad Hanser Verlag, Munich-Vienna, pages 104 to 110, chapter 3.4.1. "Catalysts" are preferably organic amines, especially tertiary aliphatic, cycloaliphatic or aromatic amines, Brønsted acids and/or Lewis-acidic organometallic compounds, Lewis-acidic organometallic compounds being particularly preferred. These are preferably Lewis-acidic organic metal compounds for which tin compounds, for example, are an option, for example tin(II) salts of organic carboxylic acids, e.g. tin(II) diacetate, tin(II) dioctoate, tin(II) bis(ethyl-hexanoate) and tin(II) dilaurate, and the dialkyltin(IV) salts of organic carboxylic acids, e.g. dimethyltin diacetate, dibutyltin diacetate, dibutyltin dibutyrate, dibutyltin bis(2-ethylhexanoate), dibutyltin dilaurate, dibutyltin maleate, dioctyltin dilaurate and dioctyltin diacetate. In addition, it is possible to use zinc(II) salts, for example zinc(II) dioctoate.

Metal complexes, such as acetylacetonates of iron, titanium, aluminum, zirconium, manga-nese, nickel, zinc and cobalt, can also be used as catalysts.

Further metal catalysts are described by Blank et al. in Progress in Organic Coatings, 1999, vol. 35, pages 19 to 29.

Tin- and zinc-free alternatives used include compounds of zirconium, of bismuth, of titanium and of aluminum. These are, for example, zirconium tetraacetylacetonate (e.g. K-KAT® 4205 from King Industries); zirconium dionates (e.g. K-KAT® XC-9213; XC-A 209 and XC-6212 from King Industries); aluminum dionate (e.g. K-KAT® 5218 from King Industries). Suitable zinc and bismuth compounds include those in which the following anions are used: $F^-$, $Cl^-$, $ClO^-$, $ClO_3^-$, $ClO_4^-$, $Br^-$, $I^-$, $IO_3^-$, $CN^-$, $OCN^-$, $NO_2^-$, $NO_3^-$, $HCO_3^-$, $CO_3^{2-}$, $S^{2-}$, $SH^-$, $HSO_3^-$, $SO_3^{2-}$, $HSO_4^-$, $SO_4^{2-}$, $S_2O_2^{2-}$, $S_2O_4^{2-}$, $S_2O_5^{2-}$, $S_2O_6^{2-}$, $S_2O_7^{2-}$, $S_2O_3^{2-}$, $H_2PO_2^-$, $H_2PO_4^-$, $HPO_4^{2-}$, $PO_4^{3-}$, $P_2O_7^{4-}$, $(OC_nH_{2n+1})^-$, $(C_nH_{2n-1}O_2)^-$, $(C_nH_{2n-3}O_2)^-$ and $(C_{n+1}H_{2n+2}O_4)^{2-}$, where n is the numbers 1 to 20. Preference is given to the carboxylates in which the anion corresponds to the formulae $(C_nH_{2n-1}O_2)^-$ and $(C_{n+1}H_{2n-2}O_4)^{2-}$ where n is 1 to 20. Particularly preferred salts have, as anions, monocarboxylates of the general formula $(C_nH_{2n-1}O_2)^-$ where n is the numbers 1 to 20. Particular mention should be made here of formate, acetate, propionate, hexanoate, neodecanoate and 2-ethylhexanoate.

Among the zinc catalysts, preference is given to the zinc carboxylates, particular preference to those of carboxylates having at least six carbon atoms, most preferably at least eight carbon atoms, especially zinc(II) diacetate or zinc(II) dioctoate or zinc(II) neodecanoate. Commercially available catalysts are, for example, Borchi® Kat 22 from OMG Borchers GmbH, Langenfeld, Germany.

Among the bismuth catalysts, preference is given to the bismuth carboxylates, particular preference to those of carboxylates having at least six carbon atoms, especially bismuth octoates, ethylhexanoates, neodecanoates or pivalates; for example K-KAT 348, XC-B221; XC-C227, XC 8203 and XK-601 from King Industries, TIB KAT 716, 716LA, 716XLA, 718, 720, 789 from TIB Chemicals and those from Shepherd Lausanne, and also, for example, Borchi® Kat 24; 315; 320 from OMG Borchers GmbH, Langenfeld, Germany.

Mixtures of different metals may also be involved, as, for example, in Borchi® Kat 0245 from OMG Borchers GmbH, Langenfeld, Germany.

Among the titanium compounds, preference is given to the titanium tetraalkoxides $Ti(OR)_4$, particular preference to those of alcohols ROH having 1 to 8 carbon atoms, for example methanol, ethanol, isopropanol, n-propanol, n-butanol, isobutanol, sec-butanol, tert-butanol, n-hexanol, n-heptanol, n-octanol, preferably methanol, ethanol, isopropanol, n-propanol, n-butanol, tert-butanol, particularly preferably isopropanol and n-butanol.

These catalysts are suitable for solvent-based, water-based and/or blocked systems.

Preferred Lewis-acidic organic metal compounds are dimethyltin diacetate, dibutyltin dibutyrate, dibutyltin bis(2-ethylhexanoate), dibutyltin dilaurate, dioctyltin dilaurate, zinc(II) dioctoate, zirconium acetylacetonate, zirconium 2,2,6,6-tetramethyl-3,5 heptanedionate and bismuth 2-ethylhexanoate.

However, particularly preferred are zinc deodecanoate, bismuth neodecanoate and bismuth 2-ethylhexanoate, very particular preference being given to bismuth neodecanoate and bismuth 2-ethylhexanoate.

It is also possible to carry out the reaction of components A1 to A6 without a catalyst. In this case, however, the reaction mixture must be exposed to higher temperatures and/or longer reaction times.

In order to avoid undesired polymerization of the (meth) acrylate groups during the reaction, polymerization inhibitors can be added in small amounts familiar to those skilled in the art. Inhibitors of this kind are described, for example, in WO 03/035596, page 5 line 35 to page 10 line 4, which is hereby incorporated by reference into the present disclosure content.

A preferred embodiment of the present invention may involve using incorporable polymerization inhibitors, i.e. those comprising an HO or $H_2N$ group, i.e. an isocyanate-reactive group. A preferred example thereof is 4-hydroxy-2,2,6,6-tetramethylpiperidine N-oxyl.

Polyurethane A can be prepared under reaction conditions by reacting components A1 to A6 without solvent or advantageously in the presence of an inert organic solvent familiar to those skilled in the art. Inert organic solvents used are in particular those organic solvents in which the amounts of components A1 to A5 used and the polyurethane A obtained are at least partially soluble at the given reaction temperature and which do not react with components A1 to A6 and the polyurethane A obtained at the reaction temperature. Examples of such organic solvents used are polar, aprotic organic solvents having a boiling point in the range 55 and 150° C. and advantageously in the range 60 and 140° C., at atmospheric pressure (1.013 bar absolute), such as in particular ketones such as acetone or methyl ethyl ketone, alkyl alkanoates such as butyl acetate or ethyl acetate, and pyrrolidones such as N-methylpyrrolidone or N-ethylpyrrolidone.

In this case, the amount of organic solvent is selected such that it is 5 and 50% by weight and advantageously 10 and 40% by weight, based in each case on the sum of the total amounts of components A1 to A6 (corresponding to 100% by weight).

If polyurethane A is prepared by reacting components A1 to A6 in an organic solvent, water is advantageously added to the reaction mixture obtained after the reaction with homogene-ous mixing and the organic solvent removed by distillation, wherein a dispersion of polyurethane A in water is formed.

In this case, a solids content of polyurethane A of 35 to 45% by weight is usually estab-lished, but this can also be up to 60% by weight.

The mean particle size of the dispersed polyurethane A is generally 10 to 250 nm, preferably 15 to 200 nm, particularly preferably 20 to 150 nm, especially preferably 30 to 120 nm. In the context of this document, the mean particle diameter is determined by the quasi-elastic light scattering method (ISO standard 13 321; cumulant z-average). However, it is important that the dispersed polyurethane A according to the invention may also be present in a multi-modal particle size distribution.

In a preferred embodiment, polyurethanes A are used having a double bond density in the range 0.01 and 2.5 and advantageously in the range 0.1 and 2.0 mol of optionally substituted acryloyloxy groups per kg of polyurethane A.

In addition to at least one polyurethane A, in particular in the form of an aqueous polyurethane A dispersion, the aqueous binder formulation according to the invention also comprises a carboxylic acid hydrazide B.

According to the invention, the carboxylic acid hydrazides B used are either monocarboxylic acid hydrazides or, advantageously also, dicarboxylic acid dihydrazides, which are derived from aliphatic, aromatic and heterocyclic mono- and dicarboxylic acids. In this case, the monocarboxylic acid hydrazides and dicarboxylic acid dihydrazides are advantageously prepared by reacting the corresponding alkyl carboxylates and dialkyl dicarboxylates or the monocarbonyl halides and dicarbonyl dihalides, in particular the corresponding monocar-bony) chlorides and dicarbonyl dichlorides, with hydrazine.

Monocarboxylic acid hydrazides B which can be used according to the invention are advantageously compounds of the following formula

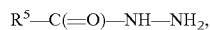

$R^5$—C(=O)—NH—NH$_2$, where $R^5$ has the definition stated above and is in particular an aliphatic or aromatic radical.

Examples of aliphatic monocarboxylic acid hydrazides B are the alicyclic compounds formyl hydrazide [HC(=O)—NH—HN$_2$], acetyl hydrazide [H$_3$C—C(=O)—NH—HN$_2$], propionyl hydrazide [H$_3$C—CH$_2$—C(=O)—NH—HN$_2$], butanoyl hydrazide [H$_3$C—(CH$_2$)$_2$—C(=O)—NH—HN$_2$], capryloyl hydrazide [H$_3$C—(CH$_2$)$_3$—C(=O)—NH—HN$_2$], the cycloaliphatic compounds cyclopentylcarboxylic acid hydrazide or cyclohexylcarboxylic acid hydrazide, and amidooxalic acid hydrazide [H$_2$N—C(=O)—(C=O)—NH—NH$_2$], the aromatic compounds benzoic acid hydrazide, 2-chlorobenzoic acid hydrazide, 2-nitrobenzoic acid hydrazide, 3-bromobenzoic acid hydrazide, 4-chlorobenzoic acid hydrazide, 4-nitrobenzoic acid hydrazide, 4-bromobenzoic acid hydrazide, 4-amino-benzoic acid hydrazide, 4-hydroxybenzoic acid hydrazide, 4-methylbenzoic acid hydrazide, phenylacetic acid hydrazide, salicylic acid hydrazide, L-tyrosine hydrazide, 3-hydroxynaph-thyloyl hydrazide or 1-acetyl-2-phenylhydrazine.

Preferred monocarboxylic acid hydrazides B are acetyl hydrazide and/or benzoyl hydrazide, particular preference being given to acetyl hydrazide.

Dicarboxylic acid dihydrazides B which can be used according to the invention are advantageously compounds of the following formula

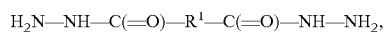

H$_2$N—NH—C(=O)—R$^1$—C(=O)—NH—NH$_2$, where $R^1$ has the definition stated above and is in particular methylene, 1,2-ethylene, 1,4-butylene or 1,2-, 1,3- or 1,4-phenylene.

Examples of aliphatic dicarboxylic acid dihydrazides B are the alicyclic compounds oxalic acid dihydrazide, malonic acid dihydrazide, succinic acid dihydrazide, glutaric acid dihydrazide, adipic acid dihydrazide. Examples of aromatic dicarboxylic acid dihydrazides are phthalic acid dihydrazide, isophthalic acid dihydrazide or terephthalic acid dihydrazide.

It is important that, in accordance with the invention, the dihydrazide of carbonic acid, the carbodihydrazide [H$_2$N—NH—C(=O)—NH—NH$_2$] may also be used as the dihydrazide compound.

Preferred dicarboxylic acid dihydrazides B are the dihydrazides of aliphatic dicarboxylic acids, malonic acid dihydrazide and/or adipic acid dihydrazide being particularly preferred.

Advantageously in accordance with the invention, carboxylic acid hydrazides B are used having a solubility of ≥5 g/l, preferably ≥10 and particularly preferably ≥100 g/l of deionized water at 20° C. and 1.013 bar (absolute). Optionally, to increase the solubility of the carboxylic acid hydrazides B, in addition aliphatic alcohols such as, in particular, methanol, ethanol and/or isopropanol can be used in amounts of ≤10% by weight, preferably ≤5% by weight, based on the aqueous binder formulation.

In the aqueous binder formulations according to the invention, the type and amounts of the polyurethane A and of the carboxylic acid hydrazide B will be selected such that the equivalent ratio of the optionally substituted acryloyloxy groups of component A4 to the hydrazide groups is generally in the range≥0.1 and ≤100, in the case of a monocarboxylic acid hydrazide B is advantageously in the range≥1 and ≤99, particularly advantageously in the range≥1.5 and ≤9 and especially advantageously in the range≥2 and ≤8 and in the case of a dicarboxylic acid dihydrazide is advantageously in the range≥1.5 and ≤99, particularly advantageously in the range≥2 and ≤50 and especially advantageously in the range≥3 and ≤9. In this case, the total amount of active binder, formed from the total amounts of polyurethane A and carboxylic acid hydrazide B, depending on the application, may be ≥20 and ≤70% by weight, advantageously≥30 and ≤65% by weight and particularly advantageously≥35 and ≤60% by weight, based in each case on the total amount of the aqueous binder formulation.

The aqueous binder formulations according to the invention are storage-stable and are able to cure both on exposure to and in the absence of high-energy radiation, which is why they can be used as binder in the production of adhesives, sealants, renders, paper coating slips, fiber nonwovens, flexible roof coatings, printing inks and coating compositions and in sand consolidation, as a component in the production of textile or leather auxiliaries and impact modifiers or to modify mineral binders and plastics.

The aqueous binder formulations can be produced in a simple manner by mixing the polyurethane A dispersed in the aqueous medium with the carboxylic acid hydrazide B, it being possible for formulations to be prepared prior to or during use of the aqueous binder formulations. The aqueous binder formulation is advantageously prepared prior to use thereof.

The aqueous binder formulations are advantageously used as binders, in particular in paint formulations, such as pigment-containing paint formulations or pigment-free clearcoat formulations.

Of course, in the context of the present invention, the aqueous binder formulations can, depending on the application, also comprise further customary auxiliaries, the type and amount of which are familiar to those skilled in the art, such as, for example, pigments, fillers, dyes, optical brighteners, retention agents, wetting agents, film-forming aids, defoamers, preservatives, biocides, slime control agents, plasticizers, antiblocking agents, antistatic agents, buffer substances, hydrophobizing agents etc., but wherein pigments and/or fillers are preferred in paint formulations.

Pigments used may in principle be all white or color pigments familiar to those skilled in the art.

On account of its high refractive index (rutile: 2.70 and anatase: 2.55) and its good hiding power, titanium dioxide in its various modifications may be mentioned as the most important white pigment. However, zinc oxide and zinc sulfide are also used as white pigments. These white pigments may be used in coated or uncoated form. In addition, organic white pigments such as non-film-forming hollow polymer particles rich in styrene and car-boxyl groups and having a particle size of approx. 300 to 400 nm (so-called opaque particles) are however also used.

In addition to white pigments, a wide variety of color pigments familiar to those skilled in the art may be used for coloring purposes, for example the somewhat relatively inexpensive inorganic oxides and sulfides of iron, cadmium, chromium, and lead, lead molybdate, cobalt blue or carbon black, and the somewhat more costly organic pigments, for example phthalo-cyanines, azo pigments, quinacridones, perylenes or carbazoles.

Fillers used are essentially inorganic materials having a lower refractive index compared to the pigments (white fillers, according to DIN 55943 and DIN 55945, have refractive index values<1.7). The pulverulent fillers are frequently naturally occurring minerals, for example calcite, chalk, dolomite, kaolin, talc, mica, diatomaceous earth, baryte, quartz or talc/chlo-rite assemblages, but also synthetically produced inorganic compounds, for example pre-cip-itated calcium carbonate, calcined kaolin or barium sulfate, and fumed silica. The filler used is preferably calcium carbonate in the form of crystalline calcite or of amorphous chalk.

If the aqueous binder formulations according to the invention comprise pigments and/or fillers, they generally have a pigment volume concentration in the range≥1 and ≤60%, advantageously≥5 and ≤50% and particularly advantageously≥10 and ≤40%. Pigment volume concentration (PVC) is understood here as meaning the volume of the pigments and fillers multiplied by 100, divided by the volume of the binder polymer plus the volume of the pigments and fillers.

$$\% \ PVC = \frac{\text{Volume of the pigments and fillers}}{\text{Volume of the binder polymer} + \text{Volume of the pigments and fillers}}$$

It is of particular importance that aqueous binder formulations for specific areas of application should also be included according to the invention, such as in particular comprise paint formulation comprising (calculated as solid)

| | |
|---|---|
| ≥20 and ≤80% by weight | polyurethane A, |
| ≥0.1 and ≤5% by weight | carboxylic acid hydrazide B, |
| ≥0 and ≤30% by weight | pigments, |
| ≥0 and ≤70% by weight | fillers, |
| ≥0 and ≤5% by weight | dispersing aids, |
| ≥0 and ≤10% by weight | thickeners, and |
| ≥0 and ≤30% by weight | further auxiliaries, such as buffer substances, biocides etc., | or
clearcoat formulations comprising (calculated as solid)

| | |
|---|---|
| ≥10 and ≤99% by weight | polyurethane A, |
| ≥0.1 and ≤5% by weight | carboxylic acid hydrazide B, |
| ≥0 and ≤80% by weight | non-self-crosslinking aqueous polyacrylate dispersion, |

-continued

| | |
|---|---|
| ≥0 and ≤5% by weight | matting agents, |
| ≥0 and ≤2% by weight | defoamer, |
| ≥0 and ≤10% by weight | film-forming aid (organic solvent, and |
| ≥0 and ≤30% by weight | further auxiliaries, such as buffer substances, biocides etc., | based in each case on the solids content of the binder formulation specified.

The binder formulations according to the invention are advantageously applied to a substrate, then dried and cured with or without exposure to high-energy radiation [electron beams and/or UV radiation]. In a corresponding manner, the coated substrate obtained in this way should also be included in accordance with the invention.

It is important in accordance with the invention that the amount of aqueous binder formulation is selected such that the coating applied to the substrate, after drying, has a layer thickness of ≤2 mm, advantageously≥0.01 and ≤1.5 mm and especially advantageously≥0.03 and ≤0.5 mm. It is of course possible in accordance with the invention for two or more identical or different binder formulation layers to be able to be applied successively to a substrate.

The substrates are coated by customary processes known to those skilled in the art, by ap-plying at least one coating composition to the substrate to be coated in the desired thickness and removing the volatile constituents from the coating compositions. This procedure may—if desired—be repeated one or more times. Application of the aqueous coating formulation to the substrate may be carried out in known fashion, for example by spraying, trow-eling, knife-coating, brushing, rolling, roller coating or pouring. The coating thickness, based on the non-aqueous components of the coating formulation, is generally in a range from about 3 to 400 g/m$^2$, preferably 10 to 200 g/m$^2$ and particularly preferably 10 to 80 g/m$^2$.

Optionally, when several layers of the aqueous coating formulations are applied one on top of the other in succession, radiation curing and intermediate sanding can take place after each coating and drying process.

The binder formulation is generally dried in a gas atmosphere, advantageously in ambient air having a relative humidity of <100%, advantageously <70% and particularly advantageously <50%. Here, the temperature can be in the range>0 and <100° C., although it is advantageously in the range≥15 and ≤80° C. The drying is usually terminated when the coating has a residual moisture of ≤10% by weight and particularly preferably ≤5% by weight. The residual moisture is generally determined by punching out a ca. 1 cm$^2$ piece of the coating, weighing it at room temperature (20 to 25° C.), then storing it for 5 minutes at 110° C. in the drying cabinet and then cooling it and weighing it again at room temperature. Here, the residual moisture corresponds to the weight difference of the coating before and after storage in the drying cabinet at 110° C., based on the weight of the coating before storage in the drying cabinet, multiplied by a factor of 100.

According to the invention, all natural or synthetic, organic or inorganic substrates can be used for coating, but preference is given to using those substrates which have a hydrophilic surface, such as metal, glass, porcelain, paper, cardboard, plastics, concrete or wood.

In the context of the present document, a substrate then has a hydrophilic surface when, at a temperature of 20° C. and atmospheric pressure, the contact angle of a droplet of deionized water applied to a horizontal flat surface of a substrate, immediately after application thereof, forms a contact angle<90° with the surface of the substrate [interfacial tension of the substrate with respect to the environment is greater than the interfacial tension of the water with respect to the environment].

If the binder formulations are cured by means of UV radiation, they preferably comprise at least one photoinitiator which can initiate the polymerization of ethylenically unsaturated double bonds.

Photoinitiators may, for example, be photoinitiators known to those skilled in the art, such as those mentioned, for example, in "Advances in Polymer Science", Volume 14, Springer Berlin 1974 or in K. K. Dietliker, Chemistry and Technology of UV- and EB-Formulation for Coatings, Inks and Paints, Volume 3; Photoinitiators for Free Radical and Cationic Polymerization, P. K. T. Oldring (Eds), SITA Technology Ltd, London.

Also suitable are, for example, mono- or bisacylphosphine oxides, as described, for example, in EP-A 7 508, EP-A 57 474, DE-A 196 18 720, EP-A 495 751 or EP-A 615 980, for example 2,4,6-trimethylbenzoyldiphenylphosphine oxide (Lucirin® TPO from BASF SE), ethyl 2,4,6-trimethylbenzoylphenylphosphinate (Lucirin® TPO L from BASF SE), bis(2,4,6-trime-thylbenzoyl)phenylphosphine oxide (Irgacure® 819 from BASF SE), benzophenones, hydroxyacetophenones, phenylglyoxylic acid and derivatives thereof or mixtures of these photoinitiators. Examples include benzophenone, acetophenone, acetonaphthoquinone, methyl ethyl ketone, valerophenone, hexanophenone, α-phenylbutyrophenone, p-morpholinopropiophe-none, dibenzosuberone, 4-morpholinobenzophenone, 4-morpholinodeoxybenzoin, p-diace-tylbenzene, 4-aminobenzophenone, 4'-methoxyacetophenone, β-methylanthraquinone, tert-butylanthraquinone, anthraquinone carboxylic acid esters, benzaldehyde, α-tetralone, 9-acetylphenanthrene, 2-acetylphenanthrene, 10-thioxanthenone, 3-acetylphenanthrene, 3-acetylin-dole, 9-fluorenone, 1-indanone, 1,3,4-triacetylbenzene, thioxanthen-9-one, xanthen-9-one, 2,4-dimethylthi-oxanthone, 2,4-diethylthioxanthone, 2,4-diisopropylthioxanthone, 2,4-dichlorothioxanthone, benzoin, benzoin isobutyl ether, chloroxanthenone, benzoin tetrahydropyranyl ether, benzoin methyl ether, benzoin ethyl ether, benzoin butyl ether, benzoin isopropyl ether, 7H-benzoin methyl ether, benz[de]anthracen-7-one, 1-naphthaldehyde, 4,4'-bis(dimethylamino)benzophenone, 4-phenylbenzophenone, 4-chlorobenzophenone, Michler's ketone, 1-acetonaphthone, 2-acetonaphthone, 1-benzoylcyclohexan-1-ol, 2-hydroxy-2,2-dimethylacetophenone, 2,2-dimethoxy-2-phenylacetophenone, 2,2-diethoxy-2-phenylacetophenone, 1,1-dichloroacetophenone, 1-hydroxyacetophenone, acetophenone dimethyl ketal, o-methoxybenzophenone, triphenylphosphine, tri-o-tolylphosphine, benz[a]anthracene-7,12-dione, 2,2-diethoxyacetophenone, benzil ketals such as benzil dimethyl ketal, 2-me-thyl-1-[4-(methylthio)phenyl]-2-morpholinopropan-1-one, anthraquinones such as 2-methylanthraquinone, 2-ethylanthraquinone, 2-tert-butylanthraquinone, 1-chloroanthraquinone, 2-amylanthraquinone and 2,3-butanedione.

Also conceivable as photoinitiators are polymeric photoinitiators, such as the diester of car-boxymethoxybenzophenone with polytetramethylene glycols of different molecular weight, preferably 200 to 250 g/mol (CAS 515136-48-8), and CAS 1246194-73-9, CAS 813452-37-8, CAS 71512-90-8, CAS 886463-10-1 or other polymeric benzophenone derivatives, such as those commercially available, for example, under the trade name Omnipo® BP from Rahn AG, Switzerland.

In a further embodiment, silsesquioxane compounds having at least one initiating group can be used as photoinitiators, as described in WO 2010/063612 A1, therein in particular from page 2, line 21 to page 43, line 9.

Typical mixtures include, for example, 2-hydroxy-2-methyl-1-phenylpropan-2-one and 1-hydroxycyclohexyl phenyl ketone, bis(2,6-dimethoxybenzoyl)-2,4,4-trimethylpen-tylphosphine oxide and 2-hydroxy-2-methyl-1-phenylpropan-1-one, benzophenone and 1-hydroxycyclohexyl phenyl ketone, bis(2,6-dimethoxybenzoyl)-2,4,4-trimethylpentylphosphine oxide and 1-hydroxycyclohexyl phenyl ketone, 2,4,6-trimethylbenzoyldiphenylphosphine oxide and 2-hydroxy-2-methyl-1-phenylpropan-1-one, 2,4,6-trimethylbenzophenone and 4-methylbenzophenone or 2,4,6-trimethylbenzophenone and 4-methylbenzophenone and 2,4,6-trimethylbenzoyldiphenylphosphine oxide.

Preferred among these photoinitiators are 2,4,6-trimethylbenzoyldiphenylphosphine oxide, ethyl 2,4,6-trimethylbenzoylphenylphosphinate, bis(2,4,6-trimethylbenzoyl)phenylphosphine oxide, benzophenone, 1-benzoylcyclohexan-1-ol, 2-hydroxy-2,2-dimethylacetophenone and 2,2-dimethoxy-2-phenylacetophenone.

If the binder formulations according to the invention are to be cured by exposure to UV radiation, then these comprise the photoinitiators preferably in an amount of 0.05 to 10% by weight, particularly preferably 0.1 to 8% by weight, especially 0.2 to 5% by weight, based in each case on the total amount of polyurethane A.

The optional radiation curing takes place by exposure to high-energy radiation, i.e. UV radiation, preferably light with a wavelength of <400 nm, advantageously 250 to 380 nm, or by irradiation with high-energy electrons (electron beams; 150 to 300 keV). Examples of radiation sources used include high-pressure mercury vapor lamps, lasers, pulsed lamps (flash light), halogen lamps or excimer lamps. The radiation dose normally sufficient for crosslinking in the case of UV curing is in the range from 80 to 3000 mi/cm$^2$. Preferred UV radiation sources are mercury low pressure lamps, medium pressure lamps, high-pressure lamps, which can optionally be doped with gallium or iron, as well as LED lamps.

Irradiation can optionally also be carried out in the absence of oxygen under an inert gas atmosphere. Suitable inert gases are preferably nitrogen, noble gases, carbon dioxide, or combustion gases. In addition, irradiation can be effected by covering the binder formulations with transparent media. Transparent media are, for example, polymeric films, glass or liquids. In one embodiment, irradiation is effected in the manner described in DE-A 199 57 900.

In a preferred process, the substrates are coated and the subsequent curing takes place continuously. In one embodiment according to the invention, the substrate treated with the binder formulation is continuously subjected to a drying process, wherein the applied binder formulation dries and slowly cures during the drying process and the subsequent storage. This process has the advantage that no energy-intensive radiation sources are required. A disadvantage of this process, however, is that the coated substrates cannot be brought into direct contact with one another and, for example, stacked during storage. In a further embodiment according to the invention, the coated substrate is exposed to such an amount of high-energy radiation in parallel to the drying process that the coating cures even in the deepest layers. This embodiment has the advantage that the coated substrates can be in contact with one another immediately after the drying/irradiation process and can be stacked or further processed directly during storage. The disadvantage of this process is the high energy costs resulting from the intensive irradiation. In a further advantageous embodiment, drying and irradiation are coupled in such a way that only such a low irradiation energy is used that is sufficient to cure only the top layer of the coating, so that the coated substrates can be brought into contact with one another and, for example, stacked. The deeper layers then cure slowly on storage of the coated substrates. This process variant has the advantage of low energy costs with simultaneous immediate stacking or further pro-cessing capability.

Another essential advantage of the binder formulations according to the invention is that the coating on substrates having shaded areas, i.e. in areas in which the high-energy radiation does not reach due to a given complex substrate shape deviating from a flat surface, in the case of attachments or structures, interstices, side surfaces and/or undersides of flat, planar substrates or as a result of the radiation-opaque solid particles present in a coating formulation, such as in particular pigments and/or fillers, also cure completely within a short time without irradiation energy. The coatings also cure in a corresponding manner when the corresponding radiation-curable, water-emulsifiable polyurethane (meth) acrylates and binder formulations comprising these are applied to a substrate in the form of thick layers which the high-energy radiation is unable to penetrate deeply or only insufficiently.

It is also important that binder systems are accessible by means of the present invention which—based on the binder system comprising the carbonyl group-free polyurethanes A and carboxylic acid hydrazides B—enable coatings with high crosslinking density or high pendulum hardness even without exposure to high-energy radiation.

Accordingly, the present document comprises the following embodiments:

1.) An aqueous binder formulation comprising
   a) a polyurethane A, and
   b) a carboxylic acid hydrazide B, wherein
   the polyurethane A can be obtained by reacting
   a1) at least one diisocyanate and/or polyisocyanate (component A1) with
   a2) at least one organic compound having at least two hydroxyl groups, which differs from components A3, A4 and A6 (component A2),
   a3) at least one organic compound having at least one group reactive to an isocyanate group and at least one dispersing group or at least one functional group which can be converted to a dispersing group and which differs from components A2, A4 and A6 (component A3),
   a4) at least one organic compound having at least one group reactive to an isocyanate group and at least one optionally substituted acryloyloxy group, which differs from components A2, A3 and A6 (component A4),
   a5) optionally at least one organic compound having only one group reactive to an isocyanate group, which differs from components A3 and A4 (component A5), and
   a6) optionally at least one organic compound having at least two groups reactive to an isocyanate group, which differs from components A2 to A4 (component A6),
   wherein none of the components A1 to A6 comprises one or more aldehydic and/or ketonic carbonyl groups.

2.) The aqueous binder formulation according to embodiment 1, wherein component A1 used is at least one aliphatic diisocyanate and/or polyisocyanate.

3.) The aqueous binder formulation according to embodiment 1 or 2, wherein component A2 used is at least one molecular compound having a molecular weight≤500 g/mol and/or at least one polymeric compound having an average molecular weight>500 g/mol.

4.) The aqueous binder formulation according to embodiment 3, wherein the at least one polymeric component A2 used is a polyesterol, a polyetherol and/or a polycarbonatol, the OH number of which, measured analogously to DIN ISO EN 4629-1, is in the range≥40 and ≤200 mg KOH/g of polymer and the acid number of which, measured in accordance with DIN 53240, is in the range<20 mg KOH/g of polymer.

5.) The aqueous binder formulation according to any of embodiments 1 to 4, wherein component A3 has at least one hydroxyl and/or at least one primary amino group as the at least one group reactive to an isocyanate group and has at least one acid group as the at least one dispersing group or the at least one functional group which can be converted to a dispersing group.

6.) The aqueous binder formulation according to any of embodiments 1 to 5, wherein component A4 has at least one hydroxyl group as the at least one group reactive to an isocyanate group and has at least one unsubstituted acryloyloxy group as the at least one optionally substituted acryloyloxy group.

7.) The aqueous binder formulation according to any of embodiments 1 to 6, wherein component A5 used is at least one aliphatic $C_1$- to $C_6$-alcohol.

8.) The aqueous binder formulation according to any of embodiments 1 to 7, wherein component A6 used is at least one aliphatic compound which has at least one primary and/or at least one secondary amino group.

9.) The aqueous binder formulation according to any of embodiments 1 to 8, wherein the carboxylic acid hydrazide B has a solubility of 5 g/l of deionized water at 20° C. and 1.013 bar (absolute).

10.) The aqueous binder formulation according to any of embodiments 1 to 9, wherein the carboxylic acid hydrazide B used is the dihydrazide of an aliphatic dicarboxylic acid.

11.) The aqueous binder formulation according to any of embodiments 1 to 11, wherein components A1 to A6 are selected in type and amount such that the ratio of the sum of the equivalent amounts of the groups, reactive to an isocyanate group, of components A2 to A6 to the equivalent amount of the isocyanate groups of component A1 is in the range≥0.8 and ≤1.2.

12.) The aqueous binder formulation according to any of embodiments 1 to 11, wherein the type and amounts of the polyurethane A and of the carboxylic acid hydrazide B are selected such that the equivalent ratio of the optionally substituted acryloyloxy groups of component A4 to the hydrazide groups of the carboxylic acid hydrazide B is in the range≥0.1 and ≤100.

13.) The use of an aqueous binder formulation according to any of embodiments 1 to 12 as binder in the production of adhesives, sealants, renders, paper coating slips, fiber nonwovens, flexible roof coatings, printing inks and coating compositions and in sand consolidation, as a component in the production of textile or leather auxiliaries and impact modifiers or to modify mineral binders and plastics.

14.) A process for coating substrates, wherein an aqueous binder formulation according to any of embodiments 1 to 12 is applied to a substrate, then dried and cured with or without exposure to high-energy radiation [electron beams and/or UV radiation].

15.) A coated substrate obtainable by a process according to embodiment 14.

The invention is described in more detail with reference to the non-limiting examples which follow.

Feedstocks used:

Luprano® 1000/1: polypropylene glycol (molar mass: 1970 g/mol; product of BASF SE)

Lupraphen® 7600/1: polyester polyol of aliphatic diol, adipic acid and aromatic dicarboxylic acid; molar mass: 2000 g/mol; product of BASF SE)

Lupraphen® 7800/1: polyester polyol of aliphatic diol, adipic acid and aromatic dicarboxylic acid; molar mass: 1000 g/mol; product of BASF SE)

Laromer® LR8765: butanediol diglycidether diacrylate (product of BASF SE)

Ebecry® 3700: bisphenol A diglycidether diacrylate (product of Allnex S.A.)

MEHQ: 4-methoxyphenol

Kerobit® BHT: stabilizer, 2,6-di-tert-butyl-p-cresol (product of BASF SE)

TEMPOL: stabilizer, 4-hydroxy-2,2,6,6-tetramethylpiperidinyloxyl

Borchi® Kat 315: catalyst based on bismuth neodecanoate (product of Borchers GmbH)

IPDI: isophorone diisocyanate

Basonat® HI 100: trimeric isocyanurate of hexamethylene diisocyanate (product of BASF SE)

PUD salt: (2-aminoethyl)-3-aminopropanoic acid, sodium salt

Rheovis® PE 1330: thickener (ca. 30% by weight aqueous solution of a polyether; product of BASF SE)

Production of the Aqueous Polyurethane Dispersions

Dispersion 1 (D1)

245.5 g of Lupranol 1000/1, 15.9 g of hydroxyethyl acrylate, 14.2 g of Laromer LR 8765, 14.2 g of Ebecryl 3700, 23.4 g of 1,4-butanediol, 1.8 g of n-pentanol, 21.2 g of 2,2-(dimethylol) propionic acid, 37.4 g of methyl ethyl ketone, 0.5 g of Kerobit BHT, 0.05 g of TEMPOL and 0.33 g of Borchi Kat 315 were initially charged at 20 to 25° C. (room temperature) under a nitrogen atmosphere in a 2l glass reactor and heated with stirring. On reaching an internal temperature of 53° C., 161.0 g of isophorone diisocyanate were added dropwise over 5 minutes, the feed line was rinsed with 17.3 g of methyl ethyl ketone and the reaction mixture was left to stir in an oil bath at an oil bath temperature of 100° C. 3 hours after reaching a maximum internal temperature of 114° C., a further 0.3 g of Borchi Kat 315 were added to the reaction mixture. The reaction mixture was then left to stir for a further 4 hours at the aforementioned oil bath temperature. After removing the oil bath and without further heating, the reaction mixture was diluted with 483.2 g of acetone while stirring. After taking a 0.5 g sample, the NCO content of the reaction mixture was determined to be 0.27% by weight. The reaction mixture obtained in this way was then transferred to a 4l distillation apparatus and heated to an internal temperature of 52° C. Without further heating, 15.8 g of diethylethanolamine were added over 5 minutes and the mixture was stirred for a further 5 minutes. Then, 748.4 g of deionized water at 20 to 25° C. were added over 15 minutes with stirring. The acetone was then distilled off at a pressure of 100 mbar (absolute) with stirring until an internal temperature of 43° C. was reached. The reaction mixture obtained was finally cooled to room temperature.

The polyurethane dispersion obtained had a solids content of 39.7% by weight and a pH of 7.5. The mean particle size was determined to be 672 nm.

In the context of this document, the NCO contents were determined by weighing a sample of the reaction mixture into a 250 ml glass beaker and dissolving it with ca. 150 ml of acetone while stirring. Using a dispenser, 10 ml of a 0.1 molar diethylbutylamine solution in N-methyl-2-pyrrolidone (NMP) were metered in. This was then back-titrated at room temperature with 0.1 molar hydrochloric acid with stirring using an 848 Titrino plus device from Metrohm.

In the context of this document, the solids contents were generally determined by drying a defined amount of the aqueous polyurethane dispersion (ca. 0.8 g) to constant weight at a temperature of 130° C. using a Mettler Toledo HR73 moisture analyzer. Two measurements were in each case carried out and the average of these two measurements was reported.

The mean particle sizes were generally determined according to ISO 13321 using a Malvern High Performance Particle Sizer at 22° C. and a wavelength of 633 nm.

The pH was generally determined by means of a calibrated InPro® 325X pH electrode from Mettler-Toledo GmbH.

Dispersion 2 (D2)

D2 was produced in exact analogy to the production of D1 with the difference that 265.9 g of Lupraphen 7600/1, 62.2 g of hydroxyethyl acrylate, 25.3 g of 2,2-(dimethylol) propionic acid, 39.3 g of methyl ethyl ketone, 0.5 g of Kerobit BHT, 0.05 g of TEMPOL and 0.65 g of Borchi Kat 315 were initially charged and heated. Starting at an internal temperature of 46° C., 137.6 g of isophorone diisocyanate were added dropwise over 5 minutes and the feed line was then rinsed with 14.8 g of methyl ethyl ketone. 3.5 hours after reaching a maximum internal temperature of 104° C., the reaction mixture (without further addition of catalyst and without further heating) was diluted with 476.7 g of acetone. An NCO content of 0.24% by weight was determined. After transferring the reaction mixture to the 4l distillation apparatus, 22.0 g of diethylethanolamine and 755.1 g of deionized water were added to the reaction mixture.

The polyurethane dispersion obtained after distillation had a solids content of 40.5% by weight and a pH of 7.3. The mean particle size was determined to be 56 nm.

Dispersion 3 (D3)

D3 was produced in exact analogy to the production of D1 with the difference that 288.8 g of Lupraphen 7600/1, 65.7 g of Laromer LR 8765, 3.9 g of n-pentanol, 19.8 g of 2,2-(dimethylol) propionic acid, 40.0 g of methyl ethyl ketone, 0.5 g of Kerobit BHT, 0.05 g of TEMPOL and 0.65 g of Borchi Kat 315 were initially charged and heated. Starting at an internal temperature of 41° C., 117.6 g of isophorone diisocyanate were added dropwise over 5 minutes and the feed line was then rinsed with 12.5 g of methyl ethyl ketone. 4.5 hours after reaching a maximum internal temperature of 100° C., 481.4 g of acetone were added to the reaction mixture (without further addition of catalyst and without further heating). An NCO content of 0.31% by weight was determined. After transferring the reaction mixture to the 4l distillation apparatus, 17.2 g of diethylethanolamine and 749.9 g of deionized water were added to the reaction mixture.

The polyurethane dispersion obtained after distillation had a solids content of 36.1% by weight and a pH of 7.9. The mean particle size was determined to be 41 nm.

Dispersion 4 (D4)

D4 was produced in exact analogy to the production of D1 with the difference that 192.0 g of Lupraphen 7600/1, 53.4 g of Ebecryl 3700, 42.8 g of 1,4-butanediol, 3.3 g of 1-pentanol, 16.2 g of (dimethylol) propionic acid, 34.2 g of methyl ethyl ketone, 0.5 g of Kerobit BHT, 0.05 g of TEMPOL and 0.7 g of Borchi Kat 315 were initially charged in the 2l reactor and heated. Starting at an internal temperature of 61° C., 191.5 g of isophorone diisocyanate were added dropwise over 5 minutes and the feed line was then rinsed with 20.7 g of methyl ethyl ketone. 3 hours and 15 minutes after reaching a maximum internal temperature of 126° C., the reaction mixture (without further addition of catalyst and without further heating) was diluted with 484.5 g of acetone. An NCO content of 0.37% by weight was determined. After transferring the reaction mixture to the 4l distillation apparatus, 13.9 g of diethylethanolamine and 746.4 g of deionized water were added to the reaction mixture.

The polyurethane dispersion obtained after distillation had a solids content of 39.8% by weight and a pH of 7.5. The mean particle size was determined to be 36 nm.

Dispersion 5 (D5)

D5 was produced in exact analogy to the production of D1 with the difference that 300.6 g of Lupraphen 7600/1, 4.2 g of hydroxyethyl acrylate, 63.0 g of Ebecryl 3700, 22.6 g of (dime-thylol) propionic acid, 43.4 g of methyl ethyl ketone, 0.50 g of Kerobit BHT, 0.05 g of TEMPOL and 0.67 g of Borchi Kat 315 were initially charged in the 2l reactor and heated. Starting at an internal temperature of 50° C., 109.0 g of isophorone diisocyanate were added dropwise over 5 minutes and the feed line was then rinsed with 11.6 g of methyl ethyl ketone. 3 hours after reaching a maximum temperature of 100° C., a further 0.3 g of Borchi Kat 315 were added to the reaction mixture. The reaction mixture was then left to stir for a further 2 hours and 20 minutes at the aforementioned oil bath temperature. After removing the oil bath and without further heating, the reaction mixture was diluted with 484.7 g of acetone while stirring. An NCO content of 0.18% by weight was determined. After transferring the reaction mixture to the 4l distillation apparatus, 13.7 g of diethylethanolamine and 746.1 g of deionized water were added to the reaction mixture.

The polyurethane dispersion obtained after distillation was diluted with a further 200 g of deionized water and then had a solids content of 30.1% by weight and a pH of 7.3. The mean particle size was determined to be 41 nm.

Dispersion 6 (D6)

D6 was produced in exact analogy to the production of D1 with the difference that 255.0 g of Lupraphen 7600/1, 3.4 g of hydroxyethyl acrylate, 44.3 g of 1,4-butanediol, 18.6 g of (di-methylol) propionic acid, 35.7 g of methyl ethyl ketone, 0.50 g of Kerobit BHT, 0.05 g of TEMPOL and 0.67 g of Borchi Kat 315 were initially charged in the 2l reactor and heated. Starting at an internal temperature of 55° C., 180.4 g of isophorone diisocyanate were added dropwise over 5 minutes and the feed line was then rinsed with 19.5 g of methyl ethyl ketone. 2 hours and 40 minutes after reaching a maximum internal temperature of 114° C., the reaction mixture (without further addition of catalyst and without further heating) was diluted with 487.1 g of acetone. An NCO content of 0.28% by weight was determined. After transferring the reaction mixture to the 4l distillation apparatus, 11.3 g of diethylethanolamine and 743.5 g of deionized water were added to the reaction mixture.

The polyurethane dispersion obtained after distillation had a solids content of 37.9% by weight and a pH of 7.6. The mean particle size was determined to be 55 nm.

Dispersion 7 (D7)

D7 was produced in exact analogy to the production of D1 with the difference that 179.4 g of Lupraphen 7600/1, 3.2 g of hydroxyethyl acrylate, 48.7 g of Laromer LR 8765, 41.5 g of 1,4-butanediol, 21.0 g of (dimethylol) propionic acid, 32.6 g of methyl ethyl ketone, 0.49 g of Kerobit BHT, 0.05 g of TEMPOL and 0.66 g of Borchi Kat 315 were initially charged in the 2l reactor and heated. Starting at an internal temperature of 45° C., 201.0 g of isophorone diisocyanate were added dropwise over 5 minutes and the feed line was then rinsed with 21.8 g of methyl ethyl ketone. 3.5 hours after reaching a maximum internal temperature of 110° C., the reaction mixture (without further addition of catalyst and without further heating) was diluted with 480.3 g of acetone. An NCO content of 0.42% by weight was determined. After transferring the reaction mixture to the 4l distillation apparatus, 18.3 g of diethylethanolamine and 751.0 g of deionized water were added to the reaction mixture.

The polyurethane dispersion obtained after distillation had a solids content of 40.4% by weight and a pH of 8.1. The mean particle size was determined to be 36 nm.

Dispersion 8 (D8)

D8 was produced in exact analogy to the production of D1 with the difference that 234.0 g of Lupranol 1000/1, 26.8 g of hydroxyethyl acrylate, 33.5 g of 1,4-butanediol, 21.5 g of (di-methylol) propionic acid, 35.1 g of methyl ethyl ketone, 0.49 g of Kerobit BHT, 0.05 g of TEMPOL and 0.66 g of Borchi Kat 315 were initially charged in the 2l reactor and heated. Starting at an internal temperature of 60° C., 178.5 g of isophorone diisocyanate were added dropwise over 5 minutes and the feed line was then rinsed with 19.3 g of methyl ethyl ketone. 4 hours after reaching a maximum internal temperature of 110° C., the reaction mixture (without further addition of catalyst and without further heating) was diluted with 479.9 g of acetone. An NCO content of 0.29% by weight was determined. After transferring the reaction mixture to the 4l distillation apparatus, 18.7 g of diethylethanolamine and 751.5 g of deionized water were added to the reaction mixture.

The polyurethane dispersion obtained after distillation had a solids content of 37.3% by weight and a pH of 7.9. The mean particle size was determined to be 424 nm.

Dispersion 9 (D9)

D9 was produced in exact analogy to the production of D1 with the difference that 245.3 g of Lupraphen 7600/1, 14.6 g of hydroxyethyl acrylate, 14.2 g of Laromer LR 8765, 14.2 g of Ebecryl 3700, 23.3 g of 1,4-butanediol, 23.4 g of (dimethylol) propionic acid, 37.2 g of methyl ethyl ketone, 0.50 g of Kerobit BHT, 0.05 g of TEMPOL and 0.66 g of Borchi Kat 315 were initially charged in the 2l reactor and heated. Starting at an internal temperature of 49° C., 160.8 g of isophorone diisocyanate were added dropwise over 5 minutes and the feed line was then rinsed with 17.3 g of methyl ethyl ketone. 5 hours after reaching a maximum internal temperature of 110° C., the reaction mixture (without further addition of catalyst and without further heating) was diluted with 481.2 g of acetone. An NCO content of 0.29% by weight was determined. After transferring the reaction mixture to the 4l distillation apparatus, 17.4 g of diethylethanolamine and 750.1 g of deionized water were added to the reaction mixture.

The polyurethane dispersion obtained after distillation had a solids content of 38.8% by weight and a pH of 7.6. The mean particle size was determined to be 66 nm.

Dispersion 10 (D10)

D10 was produced in exact analogy to the production of D1 with the difference that 382.6 g of Lupranol 1000/1, 4.3 g of hydroxyethyl acrylate, 21.4 g of (dimethylol) propionic acid, 45.4 g of methyl ethyl ketone, 0.49 g of Kerobit BHT, 0.05 g of TEMPOL and 0.66 g of Borchi Kat 315 were initially charged in the 2l reactor and heated. Starting at an internal temperature of 46° C., 86.2 g of isophorone diisocyanate were added dropwise over 5 minutes and the feed line was then rinsed with 9.0 g of methyl ethyl ketone. 6 hours and 15 minutes after reaching a maximum internal temperature of 100° C., the reaction mixture (without further addition of catalyst and without further heating) was diluted with 480.1 g of acetone. An NCO content of 0.16% by weight was determined. After transferring the reaction mixture to the 4l distillation apparatus, 18.5 g of diethylethanolamine and 851.3 g of deionized water were added to the reaction mixture.

A further 400 g of deionized water were added to the polyurethane dispersion obtained after distillation. Said dispersion had a solids content of 29.3% by weight and a pH of 8.0. The mean particle size was determined to be 26 nm.

Dispersion 11 (D11)

D11 was produced in exact analogy to the production of D1 with the difference that 188.3 g of Lupranol 1000/1, 52.1 g of Laromer LR 8765, 41.7 g of 1,4-butanediol, 3.0 g of 1-pentanol, 17.5 g of (dimethylol) propionic acid, 33.6 g of methyl ethyl ketone, 0.50 g of Kerobit BHT, 0.05 g of TEMPOL and 0.67 g of Borchi Kat 315 were initially charged in the 2l reactor and heated. Starting at an internal temperature of 40° C., 199.7 g of isophorone diisocyanate were added dropwise over 5 minutes and the feed line was then rinsed with 21.6 g of methyl ethyl ketone. 3.5 hours after reaching a maximum internal temperature of 115° C., the reaction mixture (without further addition of catalyst and without further heating) was diluted with 487.7 g of acetone. An NCO content of 0.57% by weight was determined. After transferring the reaction mixture to the 4l distillation apparatus, 10.7 g of diethylethanolamine and 742.8 g of deionized water were added to the reaction mixture.

The polyurethane dispersion obtained after distillation had a solids content of 41.7% by weight and a pH of 7.7. The mean particle size was determined to be 684 nm.

Dispersion 12 (D12)

D12 was produced in exact analogy to the production of D1 with the difference that 180.7 g of Lupranol 1000/1, 3.0 g of hydroxyethyl acrylate, 49.1 g of Ebecryl 3700, 41.8 g of 1,4-butanediol, 24.6 g of (dimethylol) propionic acid, 33.2 g of methyl ethyl ketone, 0.50 g of Kerobit BHT, 0.05 g of TEMPOL and 0.66 g of Borchi Kat 315 were initially charged in the 2l reactor and heated. Starting at an internal temperature of 56° C., 198.9 g of isophorone diisocyanate were added dropwise over 8 minutes and the feed line was then rinsed with 21.6 g of methyl ethyl ketone. 6.5 hours after reaching a maximum internal temperature of 104° C., the reaction mixture (without further addition of catalyst and without further heating) was diluted with 483.5 g of acetone. An NCO content of 0.34% by weight was determined. After transferring the reaction mixture to the 4l distillation apparatus, 15.0 g of diethylethanolamine and 747.5 g of deionized water were added to the reaction mixture.

The polyurethane dispersion obtained after distillation had a solids content of 38.8% by weight and a pH of 7.4. The mean particle size was determined to be 199 nm.

Dispersion 13 (D13)

D13 was produced in exact analogy to the production of D1 with the difference that 277.2 g of Lupranol 1000/1, 65.9 g of Ebecryl 3700, 3.9 g of 1-pentanol, 26.8 g of (dimethylol) propionic acid, 41.5 g of methyl ethyl ketone, 0.49 g of Kerobit BHT, 0.05 g of TEMPOL and 0.65 g of Borchi Kat 315 were initially charged in the 2l reactor and heated. Starting at an internal temperature of 47° C., 116.0 g of isophorone diisocyanate were added dropwise over 5 minutes and the feed line was then rinsed with 12.3 g of methyl ethyl ketone. 6 hours after reaching a maximum internal temperature of 85° C., the reaction mixture (without further addition of catalyst and without further heating) was diluted with 475.5 g of acetone. An NCO content of 0.22% by weight was determined. After transferring the reaction mixture to the 4l distillation apparatus, 23.2 g of diethylethanolamine and 756.5 g of deionized water were added to the reaction mixture. In addition, during the distillation, a further 700 g of deionized water were added.

The polyurethane dispersion obtained after distillation had a solids content of 25.7% by weight and a pH of 8.0. The mean particle size was determined to be 31 nm.

Dispersion 14 (D14)

D14 was produced in exact analogy to the production of D1 with the difference that 276.0 g of Lupraphen 7600/1, 32.7 g of hydroxyethyl acrylate, 12.4 g of 1,4-butanediol, 26.3 g of (di-methylol) propionic acid, 38.6 g of methyl ethyl ketone, 0.49 g of Kerobit BHT, 0.05 g of TEMPOL and 0.65 g of Borchi Kat 315 were initially charged in the 2l reactor and heated. Starting at an internal temperature of 52° C., 142.8 g of isophorone diisocyanate were added dropwise over 5 minutes and the feed line was then rinsed with 15.3 g of methyl ethyl ketone. 3 hours and 15 minutes after reaching a maximum internal temperature of 105° C., the reaction mixture (without further addition of catalyst and without further heating) was diluted with 475.9 g of acetone. An NCO content of 0.20% by weight was determined. After transferring the reaction mixture to the 4l distillation apparatus, 22.8 g of diethylethanolamine and 756.0 g of deionized water were added to the reaction mixture.

The polyurethane dispersion obtained after distillation had a solids content of 42.0% by weight and a pH of 7.6. The mean particle size was determined to be 31 nm.

Dispersion 15 (D15)

D15 was produced in exact analogy to the production of D1 with the difference that 213.9 g of Lupraphen 7600/1, 28.4 g of 1,4-butanediol, 18.3 g of (dimethylol) propionic acid, 47.2 g of Laromer 8765, 34.2 g of methyl ethyl ketone, 0.49 g of Kerobit BHT and 0.05 g of TEMPOL were initially charged in the 2l reactor and heated. Starting at an internal temperature of 48° C., 185.1 g of isophorone diisocyanate were added dropwise over 5 minutes and the feed line was then rinsed with 20.0 g of methyl ethyl ketone. 3 hours after reaching a maximum internal temperature of 95° C., the reaction mixture (without further addition of catalyst and without further heating) was diluted with 471.3 g of acetone. An NCO content of 1.10% by weight was determined. After transferring the reaction mixture to the 4l distillation apparatus, 2.1 g of isophoronediamine, 16.0 g of diethylethanolamine, 724.9 g of deionized water and a solution of 5.7 g of diethyltriamine and 32.4 g of deionized water were added in succession to the reaction mixture.

The polyurethane dispersion obtained after distillation had a solids content of 40.8% by weight and a pH of 8.0. The mean particle size was determined to be 61 nm.

Dispersion 16 (D16)

D16 was produced in exact analogy to the production of D1 with the difference that 204.1 g of Lupraphen 7600/1, 25.5 g of 1,4-butanediol, 18.1 g of (dimethylol) propionic acid, 69.3 g of Ebecryl 3700, 35.2 g of methyl ethyl ketone, 0.49 g of Kerobit BHT and 0.05 g of TEMPOL were initially charged in the 2l reactor and heated. Starting at an internal temperature of 50° C., 176.6 g of isophorone diisocyanate were added dropwise over 5 minutes and the feed line was then rinsed with 19.1 g of methyl ethyl ketone. 3 hours after reaching a maximum internal temperature of 101° C., the reaction mixture (without further addition of catalyst and without further heating) was diluted with 472.0 g of acetone. An NCO content of 1.17% by weight was determined. After transferring the reaction mixture to the 4l distillation apparatus, 2.0 g of isophoronediamine, 15.9 g of diethylethanolamine, 725.3 g of deionized water and a solution of 5.5 g of diethylenetriamine and 31.0 g of deionized water were added to the reaction mixture.

The polyurethane dispersion obtained after distillation had a solids content of 40.9% by weight and a pH of 7.7. The mean particle size was determined to be 61 nm.

Dispersion 17 (D17)

D17 was produced in exact analogy to the production of D1 with the difference that 277.1 g of Lupraphen 7600/1, 32.8 g of hydroxyethyl acrylate, 16.3 g of 1,4-butanediol, 20.6 g of (di-methylol) propionic acid, 38.5 g of methyl ethyl ketone, 0.49 g of Kerobit BHT, 0.05 g of TEMPOL and 0.65 g of Borchi Kat 315 were initially charged in the 2l reactor and heated. Starting at an internal temperature of 49° C., 143.4 g of isophorone diisocyanate were added dropwise over 5 minutes and the feed line was then rinsed with 15.4 g of methyl ethyl ketone. 3 hours after reaching a maximum internal temperature of 102° C., the reaction mixture (without further addition of catalyst and without further heating) was diluted with 475.8 g of acetone. An NCO content of 0.23% by weight was determined. After transferring the reaction mixture to the 4l distillation apparatus, 18.0 g of diethylethanolamine and 756.1 g of deionized water were added to the reaction mixture.

The polyurethane dispersion obtained after distillation had a solids content of 39.9% by weight and a pH of 7.4. The mean particle size was determined to be 36 nm.

Dispersion 18 (D18)

D18 was produced in exact analogy to the production of D1 with the difference that 250.8 g of Lupraphen 7600/1, 14.9 g of hydroxyethyl acrylate, 14.5 g of Laromer LR 8765, 14.5 g of Ebecryl 3700, 23.9 g of 1,4-butanediol, 23.9 g of (dimethylol) propionic acid, 38.1 g of methyl ethyl ketone, 0.51 g of Kerobit BHT, 0.05 g of TEMPOL and 0.68 g of Borchi Kat 315 were initially charged in the 2l reactor and heated. Starting at an internal temperature of 49° C., 164.5 g of isophorone diisocyanate were added dropwise over 5 minutes and the feed line was then rinsed with 17.7 g of methyl ethyl ketone. 4 hours and 45 minutes after reaching a maximum internal temperature of 105° C., the reaction mixture (without further addition of catalyst and without further heating) was diluted with 492.2 g of acetone. An NCO content of 0.25% by weight was determined. After transferring the reaction mixture to the 4l distillation apparatus, 60.6 g of a 10% by weight aqueous sodium hydroxide solution and 683.3 g of deionized water were added to the reaction mixture. In addition, during the distillation, a further 300 g of deionized water were added.

The polyurethane dispersion obtained after distillation had a solids content of 32.6% by weight and a pH of 7.7. The mean particle size was determined to be 31 nm.

Dispersion 19 (D19)

D19 was produced in exact analogy to the production of D1 with the difference that 283.5 g of Lupraphen 7600/1, 33.6 g of hydroxyethyl acrylate, 20.5 g of 1,4-butanediol, 15.4 g of (di-methylol) propionic acid, 39.2 g of methyl ethyl ketone, 0.50 g of Kerobit BHT, 0.05 g of TEMPOL and 0.67 g of Borchi Kat 315 were initially charged in the 2l reactor and heated. Starting at an internal temperature of 52° C., 146.7 g of isophorone diisocyanate were added dropwise over 5 minutes and the feed line was then rinsed with 15.8 g of methyl ethyl ketone. 2.5 hours after reaching a maximum internal temperature of 100° C., the reaction mixture (without further addition of catalyst and without further heating) was diluted with 485.1 g of acetone. An NCO content of 0.23% by weight was determined. After transferring the reaction mixture to the 4l distillation apparatus, 13.4 g of diethylethanolamine and 745.7 g of deionized water were added to the reaction mixture.

The polyurethane dispersion obtained after distillation had a solids content of 42.4% by weight and a pH of 7.7. The mean particle size was determined to be 449 nm.

Dispersion 20 (D20)

D20 was produced in exact analogy to the production of D1 with the difference that 251.9 g of Lupraphen 7600/1, 15.0 g of hydroxyethyl acrylate, 14.6 g of Laromer LR 8765, 14.6 g of Ebecryl 3700, 26.4 g of 1,4-butanediol, 20.4 g of (dimethylol) propionic acid, 38.1 g of methyl ethyl ketone, 0.51 g of Kerobit BHT, 0.05 g of TEMPOL and 0.68 g of Borchi Kat 315 were initially charged in the 2l reactor and heated. Starting at an internal temperature of 55° C., 165.1 g of isophorone diisocyanate were added dropwise over 5 minutes and the feed line was then rinsed with 17.8 g of methyl ethyl ketone. 4 hours and 10 minutes after reaching a maximum internal temperature of 111° C., the reaction mixture (without further addition of catalyst and without further heating) was diluted with 493.0 g of acetone. An NCO content of 0.25% by weight was determined. After transferring the reaction mixture to the 4l distillation apparatus, 51.7 g of a 10% by weight aqueous sodium hydroxide solution and 690.3 g of deionized water were added to the reaction mixture. In addition, during the distillation, a further 350 g of deionized water were added.

The polyurethane dispersion obtained after distillation had a solids content of 32.6% by weight and a pH of 7.9. The mean particle size was determined to be 35 nm.

Dispersion 21 (D21)

D21 was produced in exact analogy to the production of D1 with the difference that 281.7 g of Lupraphen 7600/1, 33.4 g of hydroxyethyl acrylate, 18.6 g of 1,4-butanediol, 18.0 g of (di-methylol) propionic acid, 39.1 g of methyl ethyl ketone, 0.50 g of Kerobit BHT, 0.05 g of TEMPOL and 0.66 g of Borchi Kat 315 were initially charged in the 2l reactor and heated. Starting at an internal temperature of 50° C., 145.8 g of isophorone diisocyanate were added dropwise over 5 minutes and the feed line was then rinsed with 15.7 g of methyl ethyl ketone. 2 hours after reaching a maximum internal temperature of 100° C., the reaction mixture (without further addition of catalyst and without further heating) was diluted with 482.9 g of acetone. An NCO content of 0.23% by weight was determined. After transferring the reaction mixture to the 4l distillation apparatus, 15.6 g of diethylethanolamine and 748.1 g of deionized water were added to the reaction mixture.

The polyurethane dispersion obtained after distillation had a solids content of 42.5% by weight and a pH of 7.5. The mean particle size was determined to be 309 nm.

Dispersion 22 (D22)

D22 was produced in exact analogy to the production of D1 with the difference that 252.6 g of Lupraphen 7600/1, 15.0 g of hydroxyethyl acrylate, 14.6 g of Laromer LR 8765, 14.6 g of Ebecryl 3700, 28.1 g of butanediol, 18.0 g of (dimethylol) propionic acid, 38.1 g of methyl ethyl ketone, 0.51 g of Kerobit BHT, 0.05 g of TEMPOL and 0.68 g of Borchi Kat 315 were initially charged in the 2l reactor and heated. Starting at an internal temperature of 65° C., 165.6 g of isophorone diisocyanate were added dropwise over 5 minutes and the feed line was then rinsed with 17.8 g of methyl ethyl ketone. 4 hours after reaching a maximum internal temperature of 114° C., the reaction mixture (without further addition of catalyst and without further heating) was diluted with 493.6 g of acetone. An NCO content of 0.27% by weight was determined. After transferring the reaction mixture to the 4l distillation apparatus, 45.6 g of a 10% by weight aqueous sodium hydroxide solution and 695.2 g of deionized water were added to the reaction mixture. In addition, during the distillation, a further 250 g of deionized water were added.

The polyurethane dispersion obtained after distillation had a solids content of 34.3% by weight and a pH of 8.1. The mean particle size was determined to be 39 nm.

Dispersion 23 (D23)

D23 was produced in exact analogy to the production of D1 with the difference that 173.2 g of Lupraphen 7600/1, 23.0 g of (dimethylol) propionic acid, 147.4 g of Ebecryl 3700, 38.2 g of methyl ethyl ketone, 0.49 g of Kerobit BHT and 0.05 g of TEMPOL were initially charged in the 2l reactor and heated. Starting at an internal temperature of 50° C., 149.7 g of isophorone diisocyanate were added dropwise over 5 minutes and the feed line was then rinsed with 16.1 g of methyl ethyl ketone. 4 hours after reaching a maximum internal temperature of 100° C., the reaction mixture (without further addition of catalyst and without further heating) was diluted with 471.7 g of acetone. An NCO content of 1.00% by weight was determined. After transferring the reaction mixture to the 4l distillation apparatus, 1.7 g of isophoronediamine, 18.0 g of diethylethanolamine, 729.5 g of deionized water and a solution of 4.6 g of diethylenetriamine and 26.3 g of deionized water were added to the reaction mixture. In addition, during the distillation, a further 100 g of deionized water were added. The polyurethane dispersion obtained after distillation had a solids content of 36.3% by weight and a pH of 7.7. The mean particle size was determined to be 55 nm.

Dispersion 24 (D24)

D24 was produced in exact analogy to the production of D1 with the difference that 379.1 g of Lupraphen 7600/1, 22.5 g of hydroxyethyl acrylate, 21.9 g of Laromer LR 8765, 21.9 g of Ebecryl 3700, 33.2 g of 1,4-butanediol, 40.4 g of (dimethylol) propionic acid, 57.7 g of methyl ethyl ketone, 0.77 g of Kerobit BHT, 0.08 g of TEMPOL and 1.02 g of Borchi Kat 315 were initially charged in the 2l reactor and heated. Starting at an internal temperature of 50° C., 248.5 g of isophorone diisocyanate were added dropwise over 5 minutes and the feed line was then rinsed with 26.8 g of methyl ethyl ketone. 3 hours after reaching a maximum internal temperature of 107° C., the reaction mixture (without further addition of catalyst and without further heating) was diluted with 745.2 g of acetone. An NCO content of 0.26% by weight was determined (the product obtained is also referred to below as a prepolymer). After transferring a portion of 800 g of the reaction mixture to the 4l distillation apparatus, 15.4 g of triethylamine and 589.3 g of deionized water were added to the reaction mixture. In addition, a further 100 g of deionized water were added during the distillation and a further 200 g of deionized water after the distillation.

The polyurethane dispersion obtained in this case had a solids content of 30.2% by weight and a pH of 7.3. The mean particle size was determined to be 38 nm.

Dispersion 25 (D25)

730 g of the prepolymer from Experiment 24 were weighed into the 4l distillation apparatus and heated to 53° C. 55.4 g of a 10% by weight aqueous sodium hydroxide solution and 487.8 g of deionized water were added to the reaction mixture, and the mixture was then distilled. In addition, during the distillation, a further 200 g of deionized water were added.

The polyurethane dispersion obtained after distillation had a solids content of 35.1% by weight and a pH of 7.5. The mean particle size was determined to be 38 nm.

Dispersion 26 (D26)

D26 was produced in exact analogy to the production of D1 with the difference that 179.8 g of Lupraphen 7600/1, 5.0 g of hydroxyethyl acrylate, 46.1 g of Laromer LR 8765, 41.5 g of 1,4-butanediol, 21.0 g of (dimethylol) propionic acid, 32.6 g of methyl ethyl ketone, 0.49 g of Kerobit BHT, 0.05 g of TEMPOL and 0.66 g of Borchi Kat 315 were initially charged in the 2l reactor and heated. Starting at an internal temperature of 57° C., 201.3 g of isophorone diisocyanate were added dropwise over 5 minutes and the feed line was then rinsed with 21.8 g of methyl ethyl ketone. 4 hours after reaching a maximum internal temperature of 117° C., the reaction mixture (without further addition of catalyst and without further heating) was diluted with 480.3 g of acetone. An NCO content of 0.36% by weight was determined. After transferring the reaction mixture to the 4l distillation apparatus, 18.3 g of diethylethanolamine and 751.1 g of deionized water were added to the reaction mixture. In addition, after the distillation, a further 250 g of deionized water were added.

The polyurethane dispersion obtained in this case had a solids content of 29.1% by weight and a pH of 7.6. The mean particle size was determined to be 35 nm.

Dispersion 27 (D27)

D27 was produced in exact analogy to the production of D1 with the difference that 246.6 g of Lupraphen 7600/1, 14.6 g of hydroxyethyl acrylate, 14.3 g of Laromer LR 8765, 14.2 g of Ebecryl 3700, 21.6 g of 1,4-butanediol, 26.6 g of (dimethylol) propionic acid, 37.5 g of methyl ethyl ketone, 0.50 g of Kerobit BHT, 0.05 g of TEMPOL and 0.67 g of Borchi Kat 315 were initially charged in the 2l reactor and heated. Starting at an internal temperature of 50° C., 161.7 g of isophorone diisocyanate were added dropwise over 5 minutes and the feed line was then rinsed with 17.4 g of methyl ethyl ketone. 3 hours after reaching a maximum internal temperature of 106° C., the reaction mixture (without further addition of catalyst and without further heating) was diluted with 484.7 g of acetone. An NCO content of 0.28% by weight was determined. After transferring the reaction mixture to the 4l distillation apparatus, 13.8 g of diethylethanolamine and 746.2 g of deionized water were added to the reaction mixture.

The polyurethane dispersion obtained after distillation had a solids content of 43.4% by weight and a pH of 6.9. The mean particle size was determined to be 344 nm.

Dispersion 28 (D28)

D28 was produced in exact analogy to the production of D1 with the difference that 253.8 g of Lupraphen 7600/1, 15.1 g of hydroxyethyl acrylate, 14.7 g of Laromer LR 8765, 14.7 g of Ebecryl 3700, 31.7 g of 1,4-butanediol, 12.9 g of (dimethylol) propionic acid, 38.1 g of methyl ethyl ketone, 0.51 g of Kerobit BHT, 0.05 g of TEMPOL and 0.68 g of Borchi Kat 315 were initially charged in the 2l reactor and heated. Starting at an internal temperature of 63° C., 166.4 g of isophorone diisocyanate were added dropwise over 5 minutes and the feed line was then rinsed with 17.9 g of methyl ethyl ketone. 4 hours and 10 minutes after reaching a maximum internal temperature of 112° C., the reaction mixture (without further addition of catalyst and without further heating) was diluted with 494.3 g of acetone. An NCO content of 0.25% by weight was determined. After transferring the reaction mixture to the 4l distillation apparatus, 38.5 g of a 10% by weight aqueous sodium hydroxide solution and 700.8 g of deionized water were added to the reaction mixture. In addition, during the distillation, a further 50 g of deionized water were added.

The polyurethane dispersion obtained after distillation had a solids content of 39.3% by weight and a pH of 8.0. The mean particle size was determined to be 87 nm.

Dispersion 29 (D29)

D29 was produced in exact analogy to the production of D1 with the difference that 254.3 g of Lupraphen 7600/1, 15.1 g of hydroxyethyl acrylate, 14.7 g of Laromer LR 8765, 14.7 g of Ebecryl 3700, 32.9 g of 1,4-butanediol, 11.3 g of (dimethylol) propionic acid, 38.1 g of methyl ethyl ketone, 0.51 g of Kerobit BHT, 0.05 g of TEMPOL and 0.68 g of Borchi Kat 315 were initially charged in the 2l reactor and heated. Starting at an internal temperature of 52° C., 166.7 g of isophorone diisocyanate were added dropwise over 5 minutes and the feed line was then rinsed with 18.0 g of methyl ethyl ketone. 3.5 hours after reaching a maximum internal temperature of 109° C., the reaction mixture (without further addition of catalyst and without further heating) was diluted with 494.8 g of acetone. An NCO content of 0.26% by weight was determined. After transferring the reaction mixture to the 4l distillation apparatus, 33.7 g of a 10% by weight aqueous sodium hydroxide solution and 704.6 g of deionized water were added to the reaction mixture.

The polyurethane dispersion obtained after distillation had a solids content of 42.8% by weight and a pH of 8.0. The mean particle size was determined to be 175 nm.

Dispersion 30 (D30)

D30 was produced in exact analogy to the production of D1 with the difference that 214.8 g of Lupraphen 7600/1, 30.5 g of 1,4-butanediol, 15.7 g of (dimethylol) propionic acid, 47.6 g of Laromer 8765, 34.3 g of methyl ethyl ketone, 0.50 g of Kerobit BHT and 0.05 g of TEMPOL were initially charged in the 2l reactor and heated. Starting at an internal temperature of 50° C., 186.4 g of isophorone diisocyanate were added dropwise over 5 minutes and the feed line was then rinsed with 20.2 g of methyl ethyl ketone. 3 hours after reaching a maximum internal temperature of 112° C., the reaction mixture (without further addition of catalyst and without further heating) was diluted with 473.4 g of acetone. An NCO content of 1.20% by weight was determined. After transferring the reaction mixture to the 4l distillation apparatus, 2.15 g of isophoronediamine, 13.7 g of diethylethanolamine, 722.4 g of deionized water and a solution of 5.8 g of diethylenetriamine and 32.6 g of deionized water were added to the reaction mixture.

The polyurethane dispersion obtained after distillation had a solids content of 41.2% by weight and a pH of 7.7. The mean particle size was determined to be 115 nm.

Dispersion 31 (D31)

D31 was produced in exact analogy to the production of D1 with the difference that 236.1 g of Lupraphen 7600/1, 31.5 g of 1,4-butanediol, 18.0 g of (dimethylol) propionic acid, 80.3 g of Ebecryl 3700, 40.6 g of methyl ethyl ketone, 0.57 g of Kerobit BHT and 0.06 g of TEMPOL were initially charged in the 2l reactor and heated. Starting at an internal temperature of 52° C., 204.8 g of isophorone diisocyanate were added dropwise over 5 minutes and the feed line was then rinsed with 22.1 g of methyl ethyl ketone. 4 hours and 40 minutes after reaching an increasing internal temperature of 90° C. (up to 95° C.), the reaction mixture (without further addition of catalyst and without further heating) was diluted with 545.8 g of acetone. An NCO content of 1.17% by weight was determined. After transferring the reaction mixture to the 4l distillation apparatus, 2.4 g of isophoronediamine, 15.8 g of diethylethanolamine, 559.8 g of deionized water and a solution of 6.3 g of diethylenetriamine and 35.8 g of deionized water were added to the reaction mixture.

The polyurethane dispersion obtained after distillation had a solids content of 51.2% by weight and a pH of 7.5. The mean particle size was determined to be 350 nm.

Dispersion 32 (D32)

D32 was produced in exact analogy to the production of D1 with the difference that 187.9 g of Lupraphen 7600/1, 23.4 g of (dimethylol) propionic acid, 118.1 g of Laromer 8765, 36.6 g of methyl ethyl ketone, 0.49 g of Kerobit BHT and 0.05 g of TEMPOL were initially charged in the 2l reactor and heated. Starting at an internal temperature of 45° C., 162.6 g of isophorone diisocyanate were added dropwise over 5 minutes and the feed line was then rinsed with 17.5 g of methyl ethyl ketone. 2 hours and 10 minutes after reaching a maximum internal temperature of 102° C., the reaction mixture (without further addition of catalyst and without further heating) was diluted with 470.5 g of acetone. An NCO content of 1.06% by weight was determined. After transferring the reaction mixture to the 4l distillation apparatus, 1.8 g of isophoronediamine, 18.5 g of diethylethanolamine, 729.1 g of deionized water and a solution of 5.0 g of diethylenetriamine and 28.5 g of deionized water were added to the reaction mixture. In addition, during the distillation, a further 300 g of deionized water were added.

The polyurethane dispersion obtained after distillation had a solids content of 31.5% by weight and a pH of 7.7. The mean particle size was determined to be 72 nm.

Dispersion 33 (D33)

D33 was produced in exact analogy to the production of D1 with the difference that 91.5 g of Lupraphen 7800/1, 119.1 g of hydroxyethyl methacrylate, 44.1 g of 1,4-butanediol, 200.1 g of acetone, 0.80 g of Kerobit BHT, 0.05 g of TEMPOL, 0.47 g of 4-methoxyphenol and 0.57 g of Borchi Kat 315 were initially charged in the 2l reactor and heated. Starting at an internal temperature of 48° C., 215.8 g of isophorone diisocyanate and 64.8 g of Basonat HI 100 were added dropwise over 15 min. 2 hours after reaching a maximum internal temperature of 70° C., an NCO content of 1.28% by weight was determined. After transferring the reaction mixture to the 4l distillation apparatus and rinsing with 49.9 g of acetone, 43.1 g of a 40% by weight aqueous PUD salt solution was added to the reaction mixture at a temperature of 48° C. and dispersed with 669.8 g of deionized water.

The polyurethane dispersion obtained after distillation had a solids content of 43.8% by weight and a pH of 8.0. The mean particle size was determined to be 82 nm.

Dispersion 34 (D34)

D34 was produced in exact analogy to the production of D1 with the difference that 244.4 g of Lupraphen 7600/1, 16.3 g of hydroxyethyl methacrylate, 14.1 g of Laromer LR 8765, 14.1 g of Ebecryl 3700, 23.3 g of 1,4-butanediol, 23.3 g of (dimethylol) propionic acid, 37.3 g of methyl ethyl ketone, 0.50 g of Kerobit BHT, 0.05 g of TEMPOL and 0.66 g of Borchi Kat 315 were initially charged in the 2l reactor and heated. Starting at an internal temperature of 52° C., 160.2 g of isophorone diisocyanate were added dropwise over 5 minutes and the feed line was then rinsed with 17.3 g of methyl ethyl ketone. 5 hours after reaching a maximum internal temperature of 100° C., the reaction mixture (without further addition of catalyst and without further heating) was diluted with 481.5 g of acetone. An NCO content of 0.28% by weight was determined. After transferring the reaction mixture to the 4l distillation apparatus, 17.3 g of diethylethanolamine and 750.0 g of deionized water were added to the reaction mixture. In addition, after the distillation, a further 100.0 g of deionized water were added.

The polyurethane dispersion obtained in this case had a solids content of 39.0% by weight and a pH of 7.5. The mean particle size was determined to be 84 nm.

Dispersion 35 (D35)

D35 was produced in exact analogy to the production of D1 with the difference that 202.4 g of Lupraphen 7600/1, 23.9 g of (dimethylol) propionic acid, 18.0 g of hydroxyethyl acrylate, 38.7 g of methyl ethyl ketone, 0.50 g of Kerobit BHT and 0.05 g of TEMPOL were initially charged in the 2l reactor and heated. Starting at an internal temperature of 43° C., 154.9 g of isophorone diisocyanate were added dropwise over 5 minutes and the feed line was then rinsed with 16.7 g of methyl ethyl ketone. 1 hour and 25 minutes after feeding in the isophorone diisocyanate, 104.1 g of Laromer LR 8765 were added. 8.5 hours after reaching an increasing temperature of 86° C., the reaction mixture (without further addition of catalyst and without further heating) was diluted with 481.2 g of acetone. An NCO content of 0.39% by weight was determined. After transferring the reaction mixture to the 4l distillation apparatus, 18.8 g of diethylethanolamine and 740.9 g of deionized water were added to the reaction mixture. In addition, during the distillation, a further 250 g of deionized water were added.

The polyurethane dispersion obtained after distillation had a solids content of 32.9% by weight and a pH of 7.2. The mean particle size was determined to be 36 nm.

Dispersion 36 (D36)

D36 was produced in exact analogy to the production of D1 with the difference that 279.4 g of Lupraphen 7600/1, 22.3 g of (dimethylol) propionic acid, 72.8 g of Ebecryl 3700, 41.6 g of methyl ethyl ketone, 0.50 g of Kerobit BHT and 0.05 g of TEMPOL were initially charged in the 2l reactor and heated. Starting at an internal temperature of 60° C., 121.5 g of isophorone diisocyanate were added dropwise over 5 minutes and the feed line was then rinsed with 13.0 g of methyl ethyl ketone. 3 hours and 15 minutes after reaching a maximum internal temperature of 102° C., the reaction mixture (without further addition of catalyst and without further heating) was diluted with 474.2 g of acetone. An NCO content of 0.85% by weight was determined. After transferring the reaction mixture to the 4l distillation apparatus, 1.4 g of isophoronediamine, 17.5 g of diethylethanolamine, 731.0 g of deionized water and a solution of 3.8 g of diethylenetriamine and 21.3 g of deionized water were added to the reaction mixture. In addition, during the distillation, a further 50 g of deionized water were added.

The polyurethane dispersion obtained after distillation had a solids content of 38.0% by weight and a pH of 8.0. The mean particle size was determined to be 31 nm.

Dispersion 37 (D37)

D37 was produced in exact analogy to the production of D1 with the difference that 273.9 g of Lupraphen 7600/1, 36.4 g of hydroxyethyl methacrylate, 12.3 g of 1,4-butanediol, 26.1 g of (dimethylol) propionic acid, 38.7 g of methyl ethyl ketone, 0.49 g of Kerobit BHT, 0.05 g of TEMPOL and 0.65 g of Borchi Kat 315 were initially charged in the 2l reactor and heated. Starting at an internal temperature of 52° C., 141.8 g of isophorone diisocyanate were added dropwise over 5 minutes and the feed line was then rinsed with 15.2 g of methyl ethyl ketone. 2.5 hours after reaching a maximum internal temperature of 105° C., the reaction mixture (without further addition of catalyst and without further heating) was diluted with 476.1 g of acetone. An NCO content of 0.25% by weight was determined. After transferring the reaction mixture to the 4l distillation apparatus, 22.6 g of diethylethanolamine and 755.8 g of deionized water were added to the reaction mixture.

The polyurethane dispersion obtained after distillation had a solids content of 46.2% by weight and a pH of 7.6. The mean particle size was determined to be 45 nm.

COMPARATIVE EXAMPLE 1 (C1)

C1 was produced in exact analogy to the production of D1 with the difference that 114.6 g of Lupraphen 7800/1, 68.9 g of 1-propanol, 55.3 g of 1,4-butanediol, 187.6 g of acetone, 0.89 g of Kerobit BHT, 0.06 g of TEMPOL, 0.51 g of MEHQ and 0.39 g of Borchi Kat 315 were initially charged in the 2l reactor and heated. Starting at an internal temperature of 49° C., 270.4 g of isophorone diisocyanate and 81.1 g of Basonat HI 100 were added dropwise over 15 minutes. 1 hour and 35 minutes after feeding in the isophorone diisocyanate and the Ba-sonate HI 100, a further 0.2 g of Borchi Kat 315 were added. After a total reaction time of 4 hours and 24 minutes at a constant internal temperature of 68 to 73° C., an NCO content of 1.54% by weight was determined. After transferring the reaction mixture to the 4l distillation apparatus and rinsing with 88.4 g of acetone, 54.1 g of a 40% by weight aqueous PUD salt solution was added to the reaction mixture at 49° C. and dispersed with a further 877.5 g of deionized water. In addition, during the distillation, a further 400 g of deionized water were added.

The polyurethane dispersion obtained after distillation had a solids content of 34.0% by weight and a pH of 9.5. The mean particle size was determined to be 126 nm.

Performance Testing

Determining Film Hardness

To a test portion of the polyurethane dispersions D1 to D37 and C1 with stirring at room temperature were added in each case 2.5% by weight of adipic acid dihydrazide (ADDH), based in each case on the polyurethane solids content of the corresponding polyurethane dispersion. Another test portion of the polyurethane dispersions D1 to D37 and C1 were used without addition of ADDH. If in this case the polyurethane dispersions with or without additives had a flow time of less than 20 seconds, measured using Erichsen DIN beaker 4 according to DIN 53211, then enough Rheovis PE 1330 was added until they had a viscosity in the range≥20 and ≤60 seconds (typical application level).

The resulting aqueous polyurethane dispersions D1 to D37 and C1 with or without additives were mixed homogeneously for 5 minutes at 3500 rpm using a Speedmixer DAC 150.1 FVZ immediately after their preparation or before their application. The resulting aqueous polyurethane dispersions with or without additives were then applied at room temperature with a 300 μm box-type coating bar to a grease-free 10×8 cm glass plate. The wet films obtained in this case were—as specified in Table 1 below—either dried at room temperature and 60% relative humidity in the climatically controlled room in the dark and stored for the time also specified in Table 1 or dried and filmed at the specified temperature for 30 minutes and then stored in the climatically controlled room in the dark at room temperature and 60% relative humidity for the time also specified in the table. The film layer thicknesses obtained in this case after drying and storage were in the range of 40 to 100 μm.

The König pendulum damping of the polymer films obtained after drying and storage was determined in accordance with DIN EN ISO 1522. In this case, the higher the number of seconds also specified in Table 1, the harder the obtained polymer films are assessed to be.

TABLE 1

Results of the König pendulum damping measurement

| | | Pendulum damping [s] | | | |
|---|---|---|---|---|---|
| | | without ADDH | | with ADDH | |
| Dispersion | Filming temperature | 3 days | 6 weeks | 3 days | 6 weeks |
| D1 | room temperature | 11 | 5 | 11 | 20 |
| D2 | room temperature | 2 | 4 | 3 | 10 |
| D3 | room temperature | 11 | 10 | 13 | 25 |
| D4 | 40° C. | 104 | 97 | 104 | 113 |
| D5 | 60° C. | 17 | 17 | 20 | 43 |
| D6 | 60° C. | 66 | 64 | 63 | 77 |
| D7 | 40° C. | 83 | 90 | 67 | 104 |
| D8 | room temperature | 8 | 11 | 7 | 17 |
| D9 | room temperature | 39 | 46 | 36 | 83 |
| D10 | room temperature | 2 | 2 | 2 | 4 |
| D11 | 60° C. | 50 | 57 | 49 | 67 |
| D12 | room temperature | 66 | 63 | 57 | 95 |
| D13 | room temperature | 3 | 8 | 3 | 11 |
| D14 | room temperature | 8 | 8 | 7 | 22 |
| D15 | room temperature | 77 | 84 | 46 | 91 |
| D16 | 60° C. | 87 | 92 | 74 | 98 |
| D17 | room temperature | 4 | 8 | 6 | 22 |
| D18 | 60° C. | 31 | 38 | 25 | 69 |
| D19 | room temperature | 4 | 7 | 7 | 18 |
| D20 | 60° C. | 32 | 28 | 29 | 53 |
| D21 | 40° C. | 3 | 5 | 4 | 17 |
| D22 | 60° C. | 24 | 21 | 18 | 43 |
| D23 | 80° C. | 126 | 136 | 122 | 143 |
| D24 | 60° C. | 32 | 38 | 34 | 80 |
| D25 | 60° C. | 39 | 48 | 41 | 95 |
| D26 | 60° C. | 91 | 105 | 94 | 133 |
| D27 | 40° C. | 36 | 34 | 36 | 67 |
| D28 | room temperature | 34 | 38 | 34 | 66 |
| D29 | room temperature | 29 | 34 | 31 | 67 |
| D30 | 40° C. | 76 | 99 | 63 | 116 |
| D31 | 60° C. | 92 | 98 | 91 | 112 |
| D32 | 40° C. | 63 | 76 | 57 | 123 |
| D33 | 40° C. | 55 | 60 | 66 | 112 |
| D34 | room temperature | 28 | 24 | 22 | 34 |
| D35 | room temperature | 24 | 14 | 28 | 36 |
| D36 | room temperature | 48 | 35 | 45 | 49 |
| D37 | room temperature | 8 | 11 | 8 | 14 |
| C1 | 40° C. | 67 | 66 | 60 | 62 |

From the results above it becomes clear that all polymer films produced from acryloyloxy-functionalized polyurethanes with ADDH additive have an increased pendulum hardness at the latest after a storage time of 6 weeks—compared to the polymer films produced from the corresponding polyurethane dispersions without additive.

The polyurethane of comparative dispersion C1 does not have any acrylolyoxy groups. What is striking about the corresponding results is that in this case the film hardnesses of the polyurethane dispersion without additive are even higher than the corresponding film hardnesses of the polyurethane dispersion with ADDH additive, which can be explained, for example, by the inclusion of unreacted ADDH in the polymer film.

Use of Different Hydrazide Compounds

To this end, 0.5 g of Rheovis PE1330 and the appropriate hydrazide compounds were added at room temperature to 50 g of polyurethane dispersion D33 in each case. Immediately thereafter, the respective mixture was homogeneously mixed for 5 minutes at 3500 rpm using a Speedmixer DAC 150.1 FVZ. The hydrazide compounds used were 0.51 g of adipic acid dihydrazide (D33-1), 0.29 g of carbodihydrazide (D33-2), 0.57 g of isophthalic acid dihydrazide (D33-3) and 0.44 g of acethydrazide (D33-4). The mixture of 50 g of polyurethane dispersion D33 with 0.5 g of Rheovis PE1330 without added hydrazide was used as comparison (D33-C).

Immediately after their preparation, the aforementioned formulations D33-1 to D33-4 and D33-C were applied at room temperature to a grease-free glass plate using a 300 μm box-type coating bar. The wet films obtained in this case were first dried for 30 minutes at room temperature and then for a further 30 minutes at 60° C. in the drying cabinet. The polymer films obtained were then stored in the climatically controlled room in the dark at room temperature and 60% relative humidity for the time specified in Table 2. The film layer thicknesses obtained in this case after drying and storage were in the range of 40 to 100 μm.

The König pendulum damping of the polymer films obtained after drying and storage from the formulations D33-1 to D33-4 and D33-C used was determined in accordance with DIN EN ISO 1522. The results obtained in this case are also given in Table 2.

TABLE 2

Results of the pendulum damping as a function of the carboxylic acid hydrazides used

| | Pendulum damping [s] | |
|---|---|---|
| Formulation | 3 days | 6 weeks |
| D33-1 | 15 | 87 |
| D33-2 | 22 | 90 |
| D33-3 | 15 | 48 |
| D33-4 | 16 | 64 |
| D33-C | 13 | 25 |

It can be clearly seen from the results obtained that all formulations to which a carboxylic acid hydrazide had been added form harder polymer films than formulation D33-C without additive.

The invention claimed is:
1. An aqueous binder formulation comprising
   a) a polyurethane A, and
   b) a carboxylic acid hydrazide B, wherein
   the polyurethane A is obtained by reacting
   a1) at least one diisocyanate and/or polyisocyanate (component A1) with
   a2) at least one organic compound having at least two hydroxyl groups, which differs from components A3, A4 and A6 (component A2),
   a3) at least one organic compound having at least one group reactive to an isocyanate group and at least one dispersing group or at least one functional group which can be converted to a dispersing group and which differs from components A2, A4 and A6 (component A3),
   a4) at least one organic compound having at least one group reactive to an isocyanate group and at least one optionally substituted acryloyloxy group, which differs from components A2, A3 and A6 (component A4),
   a5) optionally at least one organic compound having only one group reactive to an isocyanate group, which differs from components A3 and A4 (component A5), and
   a6) optionally at least one organic compound having at least two groups reactive to an isocyanate group, which differs from components A2 to A4 (component A6),
   wherein none of the components A1 to A6 comprises one or more aldehydic and/or ketonic carbonyl groups.

2. The aqueous binder formulation according to claim 1, wherein component A1 is at least one aliphatic diisocyanate and/or polyisocyanate.

3. The aqueous binder formulation according to claim 1, wherein component A2 is at least one molecular compound having a molecular weight ≤500 g/mol and/or at least one polymeric compound having an average molecular weight >500 g/mol.

4. The aqueous binder formulation according to claim 3, wherein the at least one polymeric component A2 is a polyesterol, a polyetherol and/or a polycarbonatol, the OH number of which is in the range ≥40 and ≤200 mg KOH/g of polymer and the acid number of which, is in the range <20 mg KOH/g of polymer.

5. The aqueous binder formulation according to claim 1, wherein component A3 has at least one hydroxyl and/or at least one primary amino group as the at least one group reactive to an isocyanate group and has at least one acid group as the at least one dispersing group or the at least one functional group which can be converted to a dispersing group.

6. The aqueous binder formulation according to claim 1, wherein component A4 has at least one hydroxyl group as the at least one group reactive to an isocyanate group and has at least one unsubstituted acryloyloxy group as the at least one optionally substituted acryloyloxy group.

7. The aqueous binder formulation according to claim 1, wherein component A5 is at least one aliphatic C1-to C6-alcohol.

8. The aqueous binder formulation according to claim 1, wherein component A6 is at least one aliphatic compound which has at least one primary and/or at least one secondary amino group.

9. The aqueous binder formulation according to claim 1, wherein the carboxylic acid hydrazide B has a solubility of ≥5 g/l of deionized water at 20° C. and 1.013 bar (absolute).

10. The aqueous binder formulation according to claim 1, wherein the carboxylic acid hydrazide B is the dihydrazide of an aliphatic dicarboxylic acid.

11. The aqueous binder formulation according to claim 1, wherein components A1 to A6 are selected such that the ratio of the sum of the equivalent amounts of the groups, reactive to an isocyanate group, of components A2 to A6 to the equivalent amount of the isocyanate groups of component A1 is in the range ≥0.8 and ≤1.2.

12. The aqueous binder formulation according to claim 1, wherein of the polyurethane A and of the carboxylic acid hydrazide B are selected such that the equivalent ratio of the optionally substituted acryloyloxy groups of component A4 to the hydrazide groups of the carboxylic acid hydrazide B is in the range ≥0.1 and ≤100.

13. A method of using the aqueous binder formulation according to claim 1, the method comprising using the aqueous binder formulation as a binder in the production of adhesives, sealants, renders, paper coating slips, fiber non-wovens, flexible roof coatings, printing inks and coating compositions and in sand consolidation, as a component in the production of textile or leather auxiliaries and impact modifiers or to modify mineral binders and plastics.

14. A process for coating substrates, wherein the aqueous binder formulation according to claim 1 is applied to a substrate, then dried and cured with or without exposure to high-energy radiation.

15. A coated substrate obtained by a process according to claim 14.

16. The process according to claim 14, wherein the high-energy radiation is from electron beams and/or UV radiation.

* * * * *